(12) United States Patent
Massa et al.

(10) Patent No.: US 12,295,400 B2
(45) Date of Patent: May 13, 2025

(54) FOAMED PRODUCT DISPENSING SYSTEM, AND PRODUCT CONTAINER

(71) Applicant: FrieslandCampina Nederland B.V., Amersfoort (NL)

(72) Inventors: Mark Robert René Massa, Wageningen (NL); Robert Matheus Adriaan Poets, Wageningen (NL); Koen Beeckman, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 717 days.

(21) Appl. No.: 17/598,522

(22) PCT Filed: Feb. 28, 2020

(86) PCT No.: PCT/NL2020/050137
§ 371 (c)(1),
(2) Date: Sep. 27, 2021

(87) PCT Pub. No.: WO2020/204697
PCT Pub. Date: Oct. 8, 2020

(65) Prior Publication Data
US 2022/0142224 A1    May 12, 2022

(30) Foreign Application Priority Data

Mar. 29, 2019    (EP) .................................... 19166278

(51) Int. Cl.
*A23P 30/40*    (2016.01)
*A47J 31/44*    (2006.01)
(Continued)

(52) U.S. Cl.
CPC ........... *A23P 30/40* (2016.08); *A47J 31/4485* (2013.01); *A47J 31/4496* (2013.01);
(Continued)

(58) Field of Classification Search
CPC ... A47J 31/4485; A47J 31/4496; A23P 30/40; A23P 2030/405; A23C 2210/30;
(Continued)

(56) References Cited

U.S. PATENT DOCUMENTS 7,229,067 B2 *   6/2007   Dimarzo ................. A62C 5/008
                                              261/DIG. 26
2005/0118319 A1   6/2005   Green et al.
(Continued)

FOREIGN PATENT DOCUMENTS

CA          2639300 A1     3/2009
CN         101396231 A     4/2009
(Continued)

*Primary Examiner* — Reginald Alexander
(74) *Attorney, Agent, or Firm* — Hoffmann & Baron, LLP

(57) ABSTRACT

A foamed product dispensing system that includes: a product dispensing machine configured to receive an exchangeable product container; and a product container configured to cooperate with the product dispensing machine after placement in the machine, wherein the product container contains a foamable product and is provided with a product processing unit including a frothing device having a product entrance for receiving product and a product exit for discharging product, and wherein the processing unit is connectable to a fluid supply for supplying gas to the product during product discharge.

23 Claims, 23 Drawing Sheets

(51) Int. Cl.
  *A47K 5/16* (2006.01)
  *B05B 7/00* (2006.01)
  *B05B 11/04* (2006.01)

(52) U.S. Cl.
  CPC ............ *A23C 2210/30* (2013.01); *A47K 5/16* (2013.01); *B05B 7/0018* (2013.01); *B05B 11/048* (2013.01)

(58) Field of Classification Search
  CPC . A47K 5/14; A47K 5/16; A45D 27/12; A45D 27/10; B05B 7/0018; B05B 7/0025; B05B 11/042; B05B 11/046; B05B 11/048
  USPC ........... 99/323.1; 261/DIG. 26; 222/190, 207
  See application file for complete search history.

(56) References Cited

U.S. PATENT DOCUMENTS

| | | | | |
|---|---|---|---|---|
| 2007/0251953 | A1* | 11/2007 | Criswell | ............ A47K 5/1207 222/105 |
| 2009/0087532 | A1* | 4/2009 | Meier | ................ A47J 31/4485 99/323.1 |
| 2012/0269945 | A1 | 10/2012 | Wijnen et al. | |
| 2013/0299518 | A1* | 11/2013 | McNulty | ................ A47K 5/14 222/207 |
| 2016/0256015 | A1* | 9/2016 | Ophardt | .................... A47K 5/14 |
| 2019/0261817 | A1* | 8/2019 | Wertheim | ............ A47K 5/1202 |
| 2019/0274487 | A1* | 9/2019 | McNulty | .................. A47K 5/16 |
| 2020/0179881 | A1 | 6/2020 | Nagasawa et al. | |

FOREIGN PATENT DOCUMENTS

| | | | | |
|---|---|---|---|---|
| EP | 2042063 | A1 | 4/2009 | |
| EP | 3100620 | A1 | 12/2016 | |
| JP | H11253099 | A | 9/1999 | |
| JP | 2009082718 | A | 4/2009 | |
| JP | 2018192138 | A | 12/2018 | |
| WO | WO-2017078692 | A1* | 5/2017 | ............... A47K 5/12 |
| WO | 2020204697 | A1 | 10/2020 | |

* cited by examiner

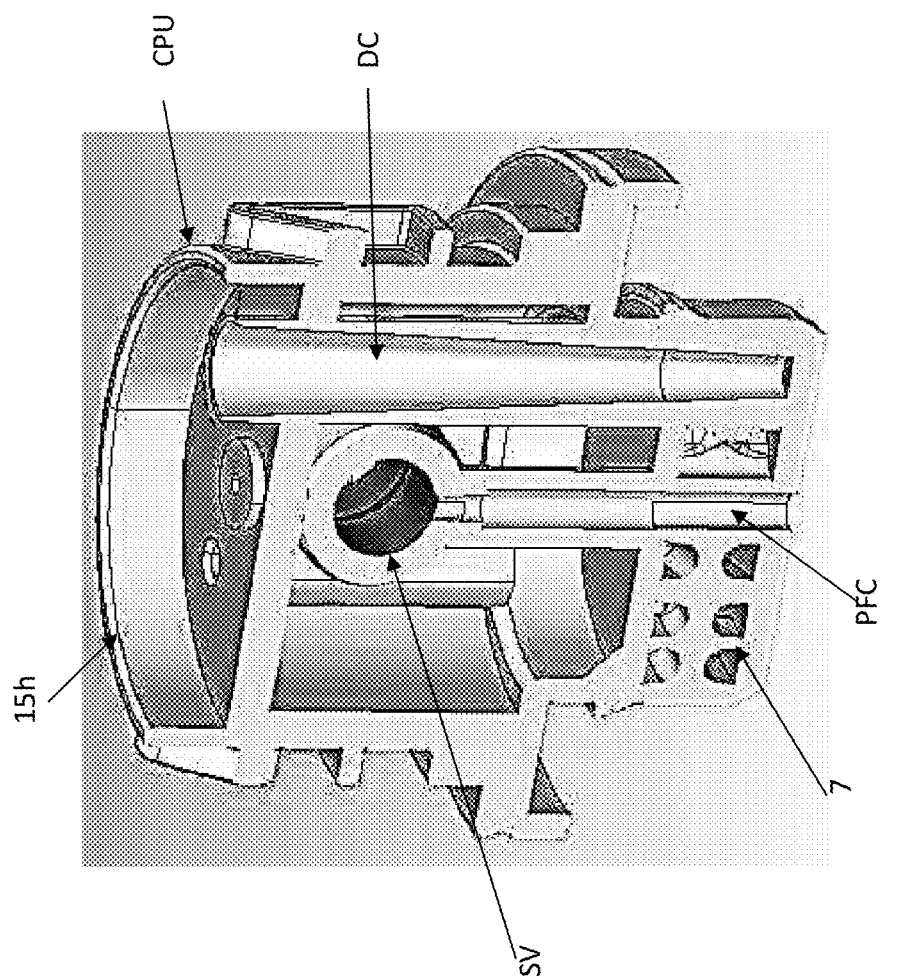

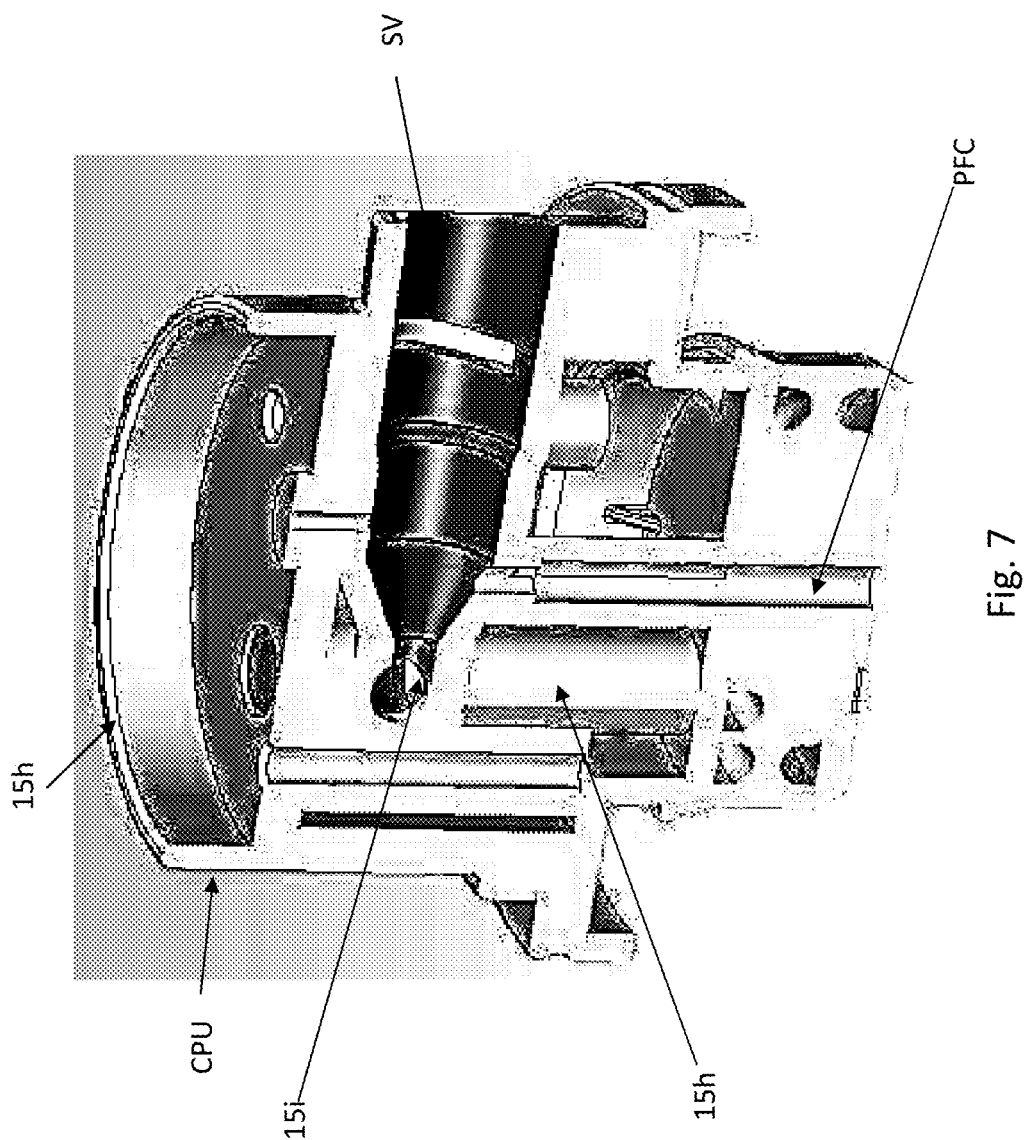

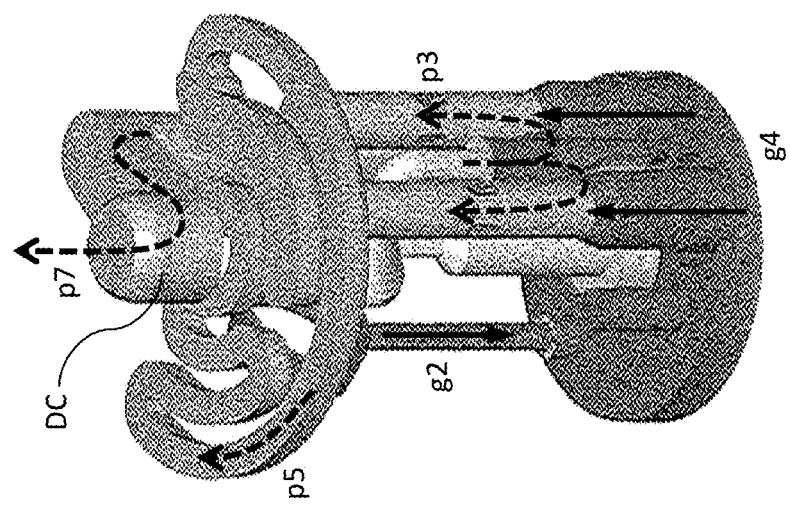
Fig. 16c
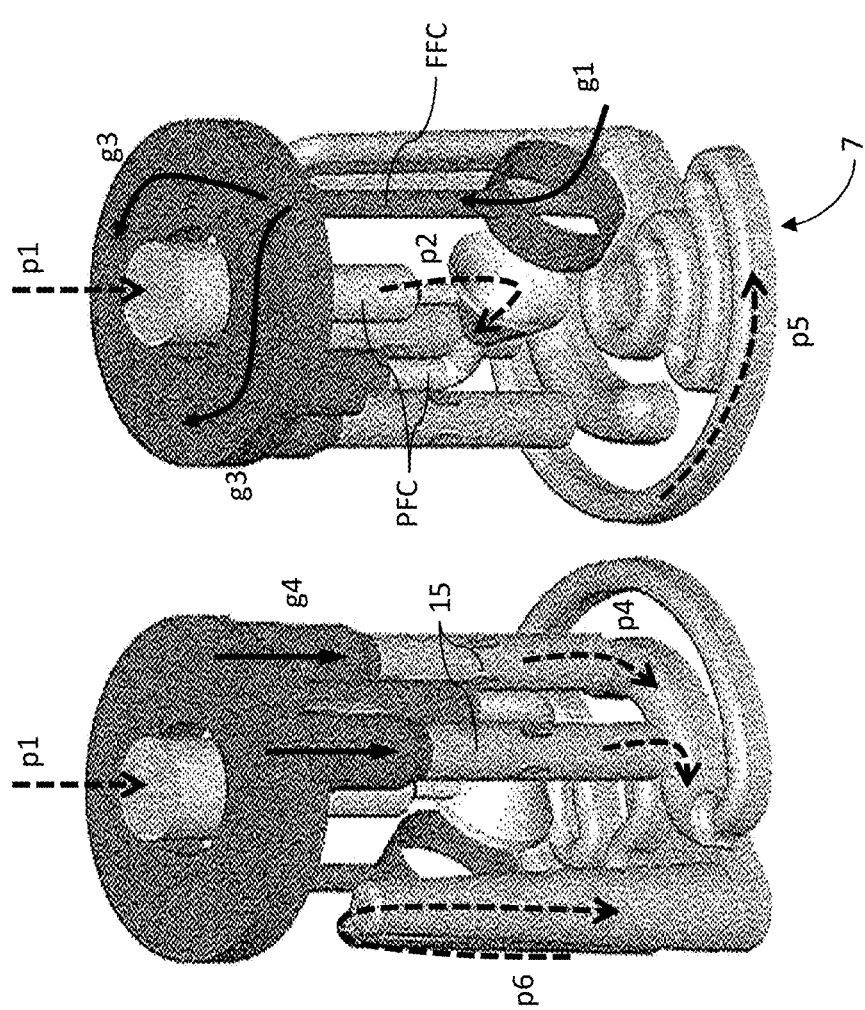
Fig. 16b
Fig. 16a

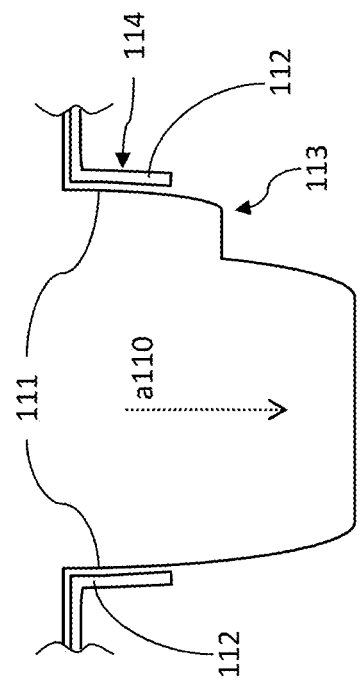
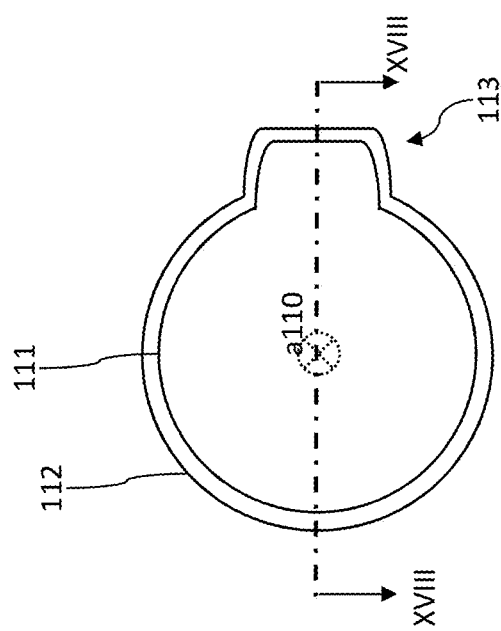
Fig. 18b
Fig. 18a

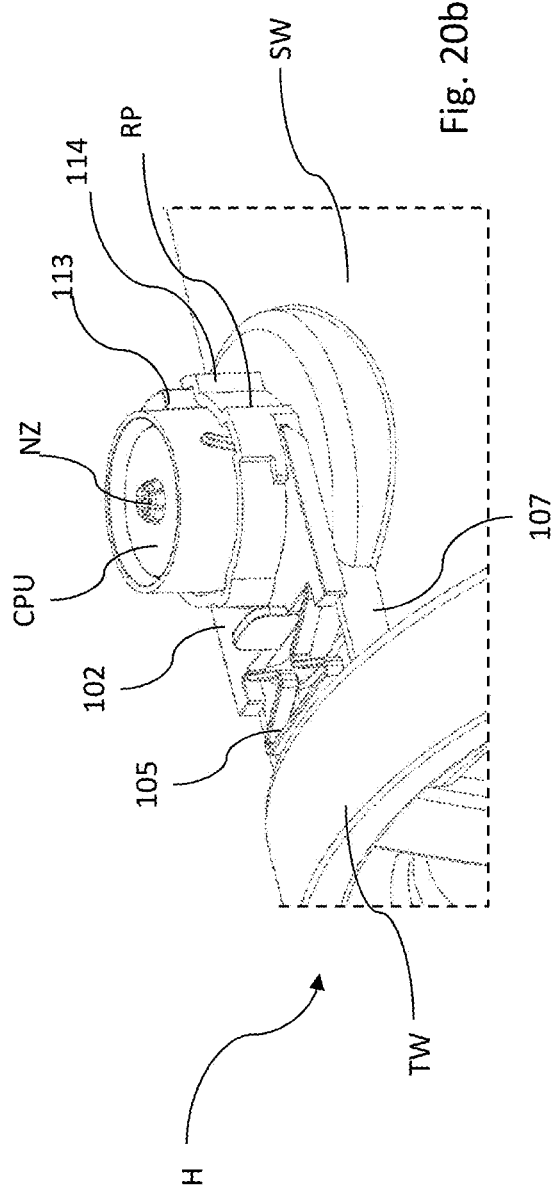
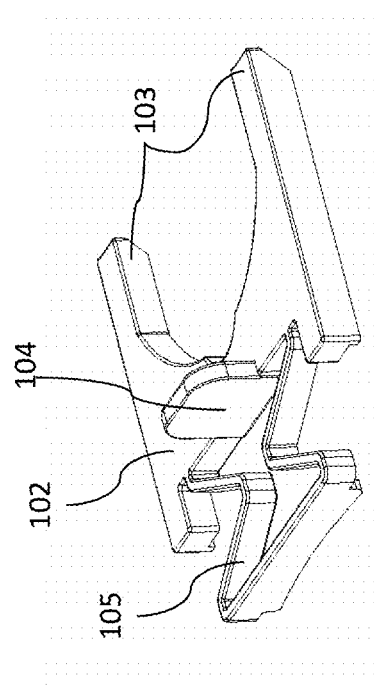

FOAMED PRODUCT DISPENSING SYSTEM, AND PRODUCT CONTAINER

This application claims priority from International Application No. PCT/NL2020/050137, filed on Feb. 28, 2020, which claims priority from European Patent Office application number EP 19166278.2, filed on Mar. 29, 2019, each of which is incorporated herein in its entirety.

TECHNICAL FIELD

The invention relates to a method and system for dispensing a product, for instance a milk product, milk, foam, cream or aerated dessert or a different product.

DESCRIPTION OF THE PRIOR ART

Such a system is known from practice in various variants. It is for instance known to contain a spray cream in an aerosol, which aerosol is manually operable for spraying the cream, see for instance European patent application EP 1 061 006A1. Although highly user-friendly, spray cream is usually of poorer quality than whipped cream. Spray cream may be less stable than whipped cream; usually, the initial firmness of spray cream is less than that of whipped cream and furthermore decreases much more rapidly over time than the firmness of whipped cream. One of the causes of this is the absence of a stabilizing network of fat in spray cream. When making whipped cream, during whipping, a network of linked together (interlinked) fat globules (also called partial coalescence) is formed which contributes to the stability of the foam. The cream that is used for spray cream is usually desensitized to partial coalescence, so as to prevent particle coalescence from occurring before spraying through shaking of the aerosol and/or temperature fluctuations (which would lead to clogging of the aerosol). Another cause of the poorer stability of spray cream is the use of, for instance, nitrogen oxide for foaming the cream. Use of nitrogen oxide is often desired because owing to the high solubility of nitrogen oxide in the cream, with an acceptable pressure in the can, sufficient gas can be stored in the can. Here, the gas dissolved in the product is released upon spraying, resulting in highly aerated foam. In addition, the high dissolvability of nitrogen oxide enables the gas to diffuse relatively rapidly from the foamed product leading to a poorer stability.

A second drawback of the known spray cream is that during spraying (in particular being consecutive dosages from a closed, disposable container), the quality of the spray cream is not constant: the gas content of the initially sprayed cream may be higher than that of the finally sprayed cream, because during spraying, the pressure of the nitrogen oxide drops.

Automated whipped cream machines are known per se from practice and are provided with static or dynamic mixers for whipping cream. Advantages of whipped cream over spray cream concern a different product quality (less aeration, higher firmness and better conservation of firmness over time). However, in general, the known whipped cream machines require much time for preparing the foamed product (compared to spray cream systems), are less user friendly (at least, difficultly operable), relatively less hygienic and therefore required frequent cleaning.

As one example of such machine with a static mixer, EP2042063 describes an arrangement for producing milk foam, teaching that therein hardly any valves or the like need be provided.

One aspect of the present invention relates in particular to a method and system for dispensing a foamed product.

Dutch patent NL 1024433 describes a method for obtaining a monodisperse foam, wherein first, a relatively coarse prefoam is produced which prefoam is then passed through a membrane. Dutch patent NL1024438 describes a different method wherein different steam beams are spouted into a product, for instance via a beam divider in the form of a membrane.

PCT/NL2009/050097 (WO2009/110794) discloses an innovative product dispensing system, configured for carrying out a method wherein gas is supplied via a microfiltration device to the product, and wherein the product downstream of the microfiltration device undergoes a mixing treatment and/or undergoes a controlled pressure reduction. The known system is provided with a holder which contains a product to be dispensed, and product discharge means for discharging product coming from the holder, wherein the product discharge means are provided with the microfiltration device which is connectable to a fluid supply for supplying gas to the product during discharge of product, characterized in that the product discharge means are further provided with a processing device which is arranged downstream of said microfiltration device for performing a mixing treatment and/or pressure reduction treatment on the product provided with gas. A respective operating device may be provided with a cavity sealable by a cover, in which the holder is removably placeable. Preferably, the cavity is hermetically sealable from the surroundings by means of the cover, for forming a pressure chamber from the cavity. When the holder is for instance empty, the holder is removed from the operating device, and can for instance be discarded or recycled. Then, a new, (full) holder can be brought into the position for cooperation with the operating device, for the purpose of continuing dispensing of the product. Further, according to one aspect, it is advantageous when in the pressure chamber of the holder a flexible bag is provided, which bag contains the product to be dispensed.

SUMMARY OF THE INVENTION

The present invention aims to provide an improved product dispensing system, in particular for efficiently, hygienically dispensing foamed product, in a reliable and user-friendly manner. In particular, an object of the invention is to provide a system and method wherein installing and optional removing/replacing of a product holder (e.g. when substantially all the product held by the holder has been foamed by the system so that the holder has become substantially empty) can be carried out swiftly, in a well controlled manner, and preferably in a hygienic manner. Also, an aim is to provide a reliable means for allowing operation and precise process control. Further, it is aimed to provide a system having an exchangeable product container that can be made in a relatively economical manner, and can still provide a reliable hygienic operation.

Further, the invention aims to provide a product dispensing system that can be reliable, providing a relatively constant product quality under varying circumstances (e.g. change of ambient temperature and/or ambient humidity and/or dispensing location), during relatively long operational periods.

In addition, the invention aims to provide a system that can be implemented in a numerous locations, wherein transport of relatively large amounts of product (to be foamed) to end-user locations can be carried out efficiently, in an economical manner.

According to a first aspect of the invention, one or more of these objects are achieved by the features of claim 1.

According to the first aspect there is provided a foamed product dispensing system, wherein the system includes:
- a product dispensing machine, configured to receive an exchangeable product container and for example to pressurize the product container;
- a product container, configured to cooperate with the product dispensing machine, after placement in the machine;

wherein the product container contains a foamable product, wherein the product container is provided with a product processing unit (CPU) including a frothing device having a product entrance for receiving product and a product exit for discharging product, wherein the processing unit is connectable to a fluid (in particular gas) supply for supplying gas to the product (preferably during product discharge), wherein the product processing unit is preferably provided with a processing device which is arranged downstream of said frothing device, for performing a mixing treatment and/or pressure reduction treatment on the product provided with gas, wherein the product processing unit includes a product feedthrough channel upstream of the frothing device, closable by a valve member, wherein the product processing unit (CPU) includes a fluid feedthrough channel upstream of the frothing device, wherein said valve member is configured for providing a fluid communication between said fluid feedthrough channel of the product processing unit and a fluid supply of the dispensing machine.

In this way, a particularly user-friendly system can be provided, and can dispense foamed product of a high quality in a reliable, hygienic manner. Furthermore, the system can be of compact, robust and economic design. In particular, the CPU's valve member (being part of the product container) for controlling product flow towards the micro filtration device is configured to provide a fluid supply (connection) as well, thereby allowing for a compact configuration and reliable construction. In particular, installing of the product container into the product dispensing machine can lead to the CPU's valve member being brought into cooperation with respective machine components, in particular a valve member actuator of the machine, wherein the coupling can automatically lead to connecting the fluid supply as well. After such installation, the valve member is available to control both product and fluid flow (depending on respective machine control states). For example, after installing of the container (wherein the valve member of the CPU is connected to or gets into communication with a machine actuator component) the system can be advantageously configured to prevent product from being dispensed while such dispensing is not desired and/or not controlled by a respective operating device of the system. Also, hygienic use can be provided by implementing an exchangeable product container (integrally including the product processing unit), avoiding potential hygiene issues caused by parts of the product dispensing machine itself getting into contact with the product. It is preferred that the product container and its CPU are substantially recyclable.

According to a further embodiment, the dispensing machine includes a valve actuator, configured to cooperate with the valve member of a placed product container for moving the valve member between a product feedthrough state and a product flow blocking state.

Further it is preferred that the valve member includes a fluid passage, arranged to connect to a fluid injector of the dispensing machine when the product container is in an operating position in the machine. In this way, the valve member itself can define or include at least part of the fluid communication from the dispensing machine towards the CPU, via the internal fluid passage.

Further reliable operation can be achieved in case the valve member is at least rotatable between a product feedthrough state and a product flow blocking state.

According to a preferred embodiment, the fluid passage of the valve member coincides with or is in parallel with an axis of rotation of the valve member.

In this manner, relatively straight-forward coupling of a fluid injector of the machine to the valve member can be achieved, allowing both physical coupling as well as a good fluid flow connection.

Good foamed product dispensing results have been achieved in case the dispensing machine is configured to feed a dry or dried fluid to the fluid feedthrough channel of the product processing unit of a placed product container.

According to a further embodiment, the dispensing machine is configured to feed air to the fluid feedthrough channel of the product processing unit of a placed product container. In that case, preferably, the dispensing machine includes an air dryer for removing water from the air, thereby providing improved product dispensing results.

Advantageously, the dispensing machine is designed to cool said holder, preferably such that the temperature of the product in the holder (H) is lower than 10° C., in particular lower than 5° C. For example, an afore-mentioned air dryer can be embedded in or forms part of a cooling system of the dispensing machine, combining various functions.

According to a further embodiment, the product container can be a substantially cylinder-shaped or bucket-shaped capsule, configured to be pressurized, e.g. to a pressure of at least 2 bar. For example, an outer wall of the container (or 'the capsule') can be made of steel, aluminum, or rigid plastic (e.g. fiber reinforced plastic), or a combination of such materials.

In a particularly advantageous exemplary embodiment, the outer wall of the container is substantially made of a plastic, for example a polyamide plastic and in particular a polyamide-6 type plastic. Preferably, the outer wall of the container is reinforced with glass fibers, for example about 30% glass fibers. In this way a relatively lightweight container (configured to be pressurized to e.g. at least 2 bar) can be provided.

According to a non limiting, but preferred, embodiment, a length of the capsule can be in the range of about 20 to 40 cm, wherein an external diameter of the capsule is in the range of about 10 to 30 cm.

Also, preferably, wherein the capsule contains at least 4 liter or a least 4 kg product before initial use, so that a relatively large amount of product is available to allow from relatively long operational times (before the container has to be exchanged with a fresh one).

In a preferred embodiment, the product dispensing machine includes a container receiving space for receiving the product container, the product container being exchangeable from the respective container receiving space, wherein a direction of container placement (into that space) is a preferably substantially horizontal direction. This is in particular advantageous in case of placing (and replacing) a relatively heavy container. It is preferred that the dispensing machine includes a container guide for guiding the container into and out of the container receiving space (along said placement direction).

According to a further embodiment, the product processing unit extends through an outer wall of the holder, in particular spaced-apart from a top wall and a bottom wall of the holder.

Preferably, the holder defines an inner space which includes a flexible bag filled with foamable product to be discharged. For example, the holder can includes a fluid inlet for receiving fluid from the product dispensing machine, in particular from a respective fluid outlet that connects to the fluid inlet after placement of the holder in the machine, in order to pressurize the inner space of the holder.

Preferably, the frothing device is provided with a microfiltration wall having gas transmissive pores, for instance, a tubular wall, which separates a gas supply space associated with the fluid supply from a foaming channel associated with the product entrance.

For example, good results are achieved in case a length of the foaming channel measured in a product flow direction is at most 10 cm.

Said length can be at most 5 cm, and more particularly is in the range of approximately 0.5-5 cm, for instance, approximately 2 cm or approximately 3 cm.

Preferably, the frothing device is provided with a filtration wall with gas transmissive pores having a pore size in the range of 0.1-10 microns, in particular a pore size of at least 0.1 micron and less than 2 microns, more particularly a pore size of at least 0.2 micron and less than 1.5 microns. It will be appreciated that, within the scope of the present disclosure, other pore sizes than those mentioned are possible. For example, in a non-limiting embodiment the pore size can be substantially in the range of 5 to 10 micron. Also, various different pore sizes and/or pore size ranges may be present in any single filtration wall.

For example, the frothing device can be provided with a housing comprising a product entrance for supply of product, a gas inlet for supply of gas, and an exit for discharge of product provided with gas, wherein said gas inlet terminates in a gas receiving space which is separated by means of a microfiltration wall from said product entrance and exit.

According to a preferred embodiment, the product dispensing machine is provided with or connectable to a gas supply to supply gas under super-atmospheric pressure to the frothing device of the processing unit.

Also, it is preferred that the product dispensing machine is provided with a control unit, preferably being user operable via a user interface or operating device of the machine, the control unit being configured for controlling fluid flow and product flow to the processing unit, wherein the control unit is preferably configured to start fluid flow before product flow in case of initiating a product discharge (thereby preventing clogging of the frothing device).

According to a preferred embodiment, the product processing unit is designed to introduce gas bubbles into the product, in particular for forming a homogeneous foam.

According to a preferred embodiment, said fluid is gas or a gas mixture, for instance, nitrogen, or air.

According to a preferred embodiment, the product present in the holder is a food product, for example cream.

Moreover, according to an extra advantageous aspect, the product processing unit can include an airtight adjustable seal configured to hermetically seal a product flow path between the product processing unit and the product container before initial use, for example before the container is used (e.g. pressurized) for a first time in the machine, and to provide a passage for flow of product from the product container towards the frothing device during use of the product container, e.g. upon a certain pressurization of seal.

The adjustable airtight seal can be embodied in various ways, for example by a valve member, a spring loaded one-way valve or return valve, by a breakable or tearable sealing member that automatically breaks or ruptures at a predetermined (control/opening) pressure, or by a sealing cap that moves from a sealing position to a flow path release position under influence of a predetermined control pressure, and/or the-like. It is preferred that the airtight adjustable seal is located upstream of the frothing unit, but that is not required.

The adjustable seal can e.g. be adjustable from an airtight product flow blocking state to a product flow release state under influence of an opening pressure in the pressurized product container, wherein the opening pressure is a super-atmospheric pressure.

Further, according to an embodiment, a wall of the product container can include a flexible and/or elastic portion, allowing an internal volume of the container to change or increase.

Further, an aspect of the invention provides a foamed product dispensing system, for example a system according to the above-described aspect, wherein the system includes:
    a product dispensing machine, configured to receive an exchangeable product container;
    a product container, configured to cooperate with the product dispensing machine, after placement in the machine;
    wherein the product container contains a foamable product,
    wherein the product container is provided with a product processing unit including a frothing device having a product entrance for receiving product from the container and a product exit for discharging product, wherein the processing unit is connectable to a fluid supply for supplying gas to the product during product discharge, wherein the product processing unit is further provided with a processing device which is arranged downstream of said frothing device, for performing a mixing treatment and/or pressure reduction treatment on the product provided with gas,
    wherein the product container is a substantially cylinder-shaped or bucket-shaped capsule, configured to be pressurized, e.g. to a pressure of at least 2 bar,
    wherein a length of the capsule is in the range of about 20 to 40 cm, wherein an external diameter of the capsule is in the range of about 10 to 30 cm,
    wherein the product dispensing machine includes a container receiving space for receiving the product container, the product container being exchangeable from the respective container receiving space, wherein a direction of container placement is a preferably substantially horizontal direction.

In this way a user friendly, easy to install, foamed product dispensing system can be provided. The capsule is relatively large, allowing for a relatively large amount of product to be loaded into the dispensing machine at initial use. Also, handling of the container can be achieved by a single person. As is mentioned before, to assist the user it is preferred if the dispensing machine includes a container guide for guiding the container into and out of the container receiving space (along said placement direction).

According to another aspect of the invention, which can optionally be combined with any of the above-mentioned aspects, there is provided a foamed product dispensing system, wherein the system includes:
    a product dispensing machine, configured to receive an exchangeable product container;

a product container, configured to cooperate with the product dispensing machine, after placement in the machine;

wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product, wherein the system is configured so that the gas supply is configured to provide a choked flow gas supply.

In this way, a constant gas flow rate towards the frothing device can be achieved during operation, in particular substantially independent on any change the frothing device might experience during a certain operational period. For example, in the case that the frothing device includes small pores for injecting the gas into the product, the application of a choked flow gas supply can suppress pore clogging and/or lead to proper and reliable functioning of the frothing device in case any pore clogging does happen.

Further, there is provided a product container, evidently configured to be part of a system according to the invention, wherein the product container contains a foamable product, wherein the product container is provided with a product processing unit including a frothing device having a product entrance for receiving product and a product exit for discharging product, wherein the processing unit is connectable to a fluid supply for supplying gas to the product during product discharge, wherein the product processing unit is further provided with a processing device which is arranged downstream of said frothing device, for performing a mixing treatment and/or pressure reduction treatment on the product provided with gas, wherein the product processing unit includes a product feedthrough channel upstream of the frothing device, closable by a valve member, wherein the product processing unit includes a fluid feedthrough channel upstream of the frothing device, wherein said valve member is configured for providing a fluid communication between said fluid feedthrough channel of the product processing unit and a fluid supply of the dispensing machine.

Thus, above-mentioned advantages can be achieved as well. In a preferred embodiment, the container is configured to provide a pressure vessel, a container wall e.g. being made of steel or another rigid material suitable to provide such a pressure vessel. As is mentioned before, according to a preferred embodiment the outer wall of the container is made of a plastic, for example a polyamide-6 type plastic. Preferably, a plastic outer wall of the container is reinforced with glass fibers, for example about 30% glass fibers.

Further, an aspect of the invention provides an innovative a method for dispensing foamed product, comprising:
  receiving an exchangeable product container in a product dispensing machine, wherein the product container contains a foamable product, preferably a food product, for example cream, wherein the product container is provided with a frothing device and a product feedthrough channel, closable by a valve member;
  discharging product from the product container;
  moving the valve member from a product flow blocking state to a product feedthrough state;
  supplying gas, for instance nitrogen gas or air, preferably dried air, preferably at super-atmospheric pressure, via a fluid passage of the valve member and via the frothing device to the product (e.g. before and/or during product discharge) to introduce gas bubbles into the product, in particular for forming a homogeneous foam;
  and optionally reducing a pressure of the product supplied with gas.

In this way the valve member is used to control product flow, and additionally for supply of gas, allowing a compact, hygienic and reliable way of dispensing (and foaming) the product.

According to another aspect of the invention, which can optionally be combined with any of the above-mentioned aspects, there is provided a foamed product dispensing system, wherein the system includes:
  a product dispensing machine, configured to receive an exchangeable product container;
  a product container configured to cooperate with the product dispensing machine, after placement in the machine;
  wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
  wherein the product dispensing machine includes a container receiving space for receiving the product container, the product container being exchangeable from the respective container receiving space, wherein a direction of container placement is a preferably substantially horizontal direction,
  wherein the dispensing machine is configured to cool said product container after placement in the container receiving space, preferably such that the temperature of the product in the container including in the product processing unit is lower than 10° C., in particular lower than 5° C.

Preferably, the dispensing machine includes at least one cooling duct containing a cooling liquid, wherein the cooling duct preferably surrounds at least part of the container receiving space, for example extending along a helical path around the container receiving space.

Preferably, the container receiving space is defined by a wall structure, surrounding that space, the wall structure preferably including a closable foamed product passage below the processing unit of a placed product container. Preferably, the wall structure includes or is provided with a said cooling duct.

According to a preferred embodiment the system includes a closing member for closing the closable product passage of the wall structure of the container receiving space, the closing member in particular being configured to limit heat transfer between an environment of the system on one hand and the container receiving space on the other, wherein the closing member is movable towards an opened state, preferably by an actuator, permitting foamed product discharge via the product passage of the wall structure of the container receiving space.

A further advantage of the closing member is that it can also limit water vapor flow into the container receiving space, which is in particular advantageous when the system is used in a relatively humid environment (e.g. in the tropics).

According to another aspect of the invention, which can optionally be combined with any of the above-mentioned aspects, there is provided a foamed product dispensing system, including:
  a product dispensing machine, configured to receive an exchangeable product container;

a product container configured to cooperate with the product dispensing machine, after placement in the machine;

wherein the product container has a product holding space containing a foamable product, for example a food product, for example cream, wherein the product container is provided with a product processing unit including a frothing device having a product entrance for receiving product and a product exit for discharging product, wherein the processing unit is connectable to a fluid supply for supplying gas to the product, wherein the product processing unit includes an airtight seal configured to hermetically seal a product flow path between the product processing unit and the product holdings space of the product container before initial use of the product container, and to provide a passage for flow of product from the product container towards the frothing device during use of the product container, Preferably, the airtight seal is located adjacent to or at or in a product discharge opening of the product holding space of the container. Also, preferably, the airtight seal is adjustable from a flow blocking state to a product flow release state under influence of an opening pressure upstream of the seal, for example a pressure in the product holding space of the product container, wherein the opening pressure is a super-atmospheric pressure.

Further, preferably, a wall of the product container includes a flexible and/or elastic portion, allowing an internal volume of the container to change or increase.

According to another aspect of the invention, which can optionally be combined with any of the above-mentioned aspects, there is provided a foamed product dispensing system, including:
a product dispensing machine, configured to receive an exchangeable product container;
a product container, configured to cooperate with the product dispensing machine, after placement in a pressurization chamber in the machine;
wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
wherein the pressurization chamber is defined by a wall structure, the wall structure including a CPU-receiving port for receiving the product processing unit, and for engaging an exterior surface of the product processing unit in an airtight manner, the product processing unit in particular protruding through the port towards a product discharging area.

Preferably, the airtight engagement of the exterior surface of the product processing unit and the CPU-receiving port is configured to withstand pressurization of the a pressurization chamber, Also, preferably, the engagement between the product processing unit and the CPU-receiving port of the machine is releasable, in particular allowing replacement of the product container.

The system is preferably configured to provide feedback to a user regarding engagement between the product processing unit and the receiving port. The CPU receiving port and the product processing unit are preferably configured to jointly produce a sound and/or a haptic feedback signal, for example a click, upon such engagement.

According to another aspect of the invention, which can optionally be combined with any of the above-mentioned aspects, there is provided a foamed product dispensing system, including:
a product dispensing machine, configured to receive an exchangeable product container;
a product container, configured to cooperate with the product dispensing machine, after placement in the machine;
wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
wherein the product processing unit is provided with an airtight sealing cap configured to seal a downstream product discharge area of the product processing unit from an environment, the downstream area containing a product discharge nozzle of the system.

According to another aspect of the invention, which can optionally be combined with any of the above-mentioned aspects, there is provided a foamed product dispensing system, the system including:
a product dispensing machine, configured to receive an exchangeable product container;
a product container, configured to cooperate with the product dispensing machine, after placement in the machine;
wherein the product container contains a foamable product,
preferably a food product, for example cream, wherein the product container is provided with a product processing unit including a frothing device having a product entrance for receiving product and a product exit for discharging product, wherein the processing unit is connectable to a fluid supply for supplying gas to the product,
wherein, during use, the product processing unit extends outside a pressurized space of the system, wherein a border of the pressurized space includes a CPU opening for exchangeably receiving the product processing unit,
wherein the system includes a wall structure, the wall structure including a CPU-receiving port for receiving the product processing unit,
wherein a shape of the product processing unit is configured to substantially mate with a shape of the CPU receiving port for positioning the product processing unit with respect to the wall structure,
wherein a shape of the product processing unit and a corresponding shape of the CPU receiving port are preferably rotationally asymmetric about an axis that substantially corresponds to a direction of receiving the processing unit in the port.

Preferably at least one of the shape of the product processing unit and the shape of the CPU opening is a tapered shape.

According to another aspect of the invention, which can optionally be combined with any of the above-mentioned aspects, there is provided a foamed product dispensing system, including:
a product dispensing machine, configured to receive an exchangeable product container;
a product container, configured to cooperate with the product
dispensing machine, to be pressurized, after placement in the machine, wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product, wherein the system further includes an exchangeable capsule configured to exchangeably receive the product container, wherein the machine is configured to exchangeably receive the capsule containing the product container.

In a preferred embodiment, the capsule is configured to cooperate with the product dispensing machine to be pressurized.

Furthermore, preferably, the capsule preferably comprises a removable lid for providing access to the internal space of the capsule for exchanging the product container, wherein the lid is preferably configured to cooperate with a remaining part of the capsule to form an airtight connection there-between when the lid is in an assembled closed position.

The product container preferably comprises a flexible bag containing product. Also, preferably, the capsule is a rigid capsule. The capsule can have various shapes, for example (but not limited to) the a cylinder-shape and/or bucket-shape.

According to another aspect of the invention, which can optionally be combined with any of the above-mentioned aspects, there is provided a product container, evidently configured to be part of a system according to the invention. The product container contains a foamable product, wherein the product container is provided with a product processing unit including a frothing device having a product entrance for receiving product and a product exit for discharging product, wherein the processing unit is connectable to a fluid supply for supplying gas to the product, wherein the product processing unit is preferably provided with a processing device which is arranged downstream of said frothing device, for performing a mixing treatment and/or pressure reduction treatment on the product provided with gas.

According to a further embodiment, the frothing device has at least one microfiltration wall that includes a hydrophobic and/or oleophobic material, for example PTFE (polytetrafluorethylene).

According to a further embodiment the product processing unit includes an airtight seal configured to hermetically seal a product flow path between the product processing unit and a product holding space of the product container before initial use of the product container, and to provide a passage for flow of product from the product container towards the frothing device during use of the product container.

According to a further embodiment, the product processing unit is configured to cooperate with a receiving port of a wall structure of a pressurization chamber, for mutual engagement in an airtight manner.

According to a further embodiment, the product processing unit is provided with an airtight sealing cap configured to seal a downstream product discharge area of the product processing unit from an environment, the downstream area containing a product discharge nozzle of the container.

According to a further embodiment, the container includes a wall structure, the wall structure including a CPU-receiving port for receiving the product processing unit, wherein a shape of the product processing unit is configured to substantially mate with a shape of the CPU receiving port for positioning the product processing unit with respect to the wall structure of the container.

According to a further embodiment, the product container comprises a flexible bag containing product, wherein the flexible bag is at least partly flexible for allowing change of an internal volume of the bag According to another aspect of the invention, which can optionally be combined with any of the above-mentioned aspects, there is provided a foamed product dispensing system, wherein the system includes:
  a product dispensing machine, configured to receive an exchangeable product container;
  a product container, configured to cooperate with the product dispensing machine, after placement in the machine;
  wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
  wherein the frothing device is provided with a microfiltration wall having gas transmissive pores, for instance, a tubular wall, which separates a gas supply space associated with the fluid supply from a foaming channel associated with the product entrance,
  wherein the microfiltration wall includes a hydrophobic and/or oleophobic material, for example PTFE (polytetrafluorethylene).

For example, the microfiltration wall can be made of a hydrophobic material, or it can contain a certain amount of hydrophobic material.

Additionally or alternatively, the microfiltration wall can include a coating that includes or consist of a hydrophobic and/or oleophobic material. For example, such a coating can be applied in various ways, for example via one or more of plasma coating, vapour deposition, chemical vapour deposition, immersion coating, or differently. Further, there is provided a product container, evidently configured to be part of a system according any of the above-described aspects of the invention, wherein the product container contains a foamable product, wherein the product container is provided with a product processing unit including a frothing device having a product entrance for receiving product and a product exit for discharging product, wherein the processing unit is connectable to a fluid supply for supplying gas to the product during product discharge,
  wherein the frothing device is provided with a microfiltration wall having gas transmissive pores, for instance, a tubular wall, which separates a gas supply space associated with the fluid supply from a foaming channel associated with the product entrance,
  wherein the microfiltration wall is configured to prevent clogging of the microfiltration wall,
  wherein the microfiltration wall includes a hydrophobic and/or oleophobic material, for example PTFE (polytetrafluorethylene).

It has been found that in this way, a further reliable and durable operation of the system can be achieved, wherein the application of the hydrophobic an/or oleophobic material can lead to a reduction of chances of clogging of the pores of the microfiltration wall.

According to another aspect of the invention, which can optionally be combined with any of the above-mentioned aspects, there is provided a method for producing an airtightly sealed product container containing sterilized foamable product, wherein the product container includes a sterilized frothing device, a sterilized valve member having a fluid passage, a sterilized sealed off fluid inlet for connection to a gas supply after unsealing and a sterilized sealed off discharge channel for discharging foamed product after unsealing, wherein the method comprises:

provided a product container containing foamable product, wherein the product container is airtightly connected to an assembly including a frothing device, a valve member having a fluid passage, a fluid inlet for connection to a gas supply and a discharge channel for discharging foamed product;

providing the fluid inlet and the discharge channel with a removable airtight seal to airtightly seal off said fluid inlet and said discharge channel from ambient air; and sterilizing, for example irradiating and/or heating, the product container provided with foamable product, assembly and seal.

Non-limiting examples of the invention will be explained in the following, with reference to the accompanying drawings.

DESCRIPTION OF THE DRAWINGS

FIG. 6 shows a perspective view of a second vertical cross-section of the CPU shown in FIG. 4, taken in parallel to the cross-section of FIG. 5, along the product outflow channel;

FIG. 7 shows a perspective view of a third vertical cross-section of the CPU shown in FIG. 4, taken at right angles to the cross-sections of FIGS. 5 and 6, coinciding with the central axis of the valve;

FIGS. 16a-c each show a perspective view of product flow paths and fluid flow paths in the CPU;

FIG. 18a schematically shows a top-down cross-sectional view of a shape of a CPU and a corresponding mating shape of a CPU receiving port;

FIG. 18b shows a sideways cross-sectional view over line XVIII-XVIII FIG. 18a;

FIGS. 20a-c show perspective views of a CPU and a CPU holding latch; and

DETAILED DESCRIPTION OF THE INVENTION

In the present application, corresponding or similar features are denoted by corresponding or similar reference signs.

FIGS. 1-21 show non-limiting examples of a system for dispensing a foamed product.

Figure 1:
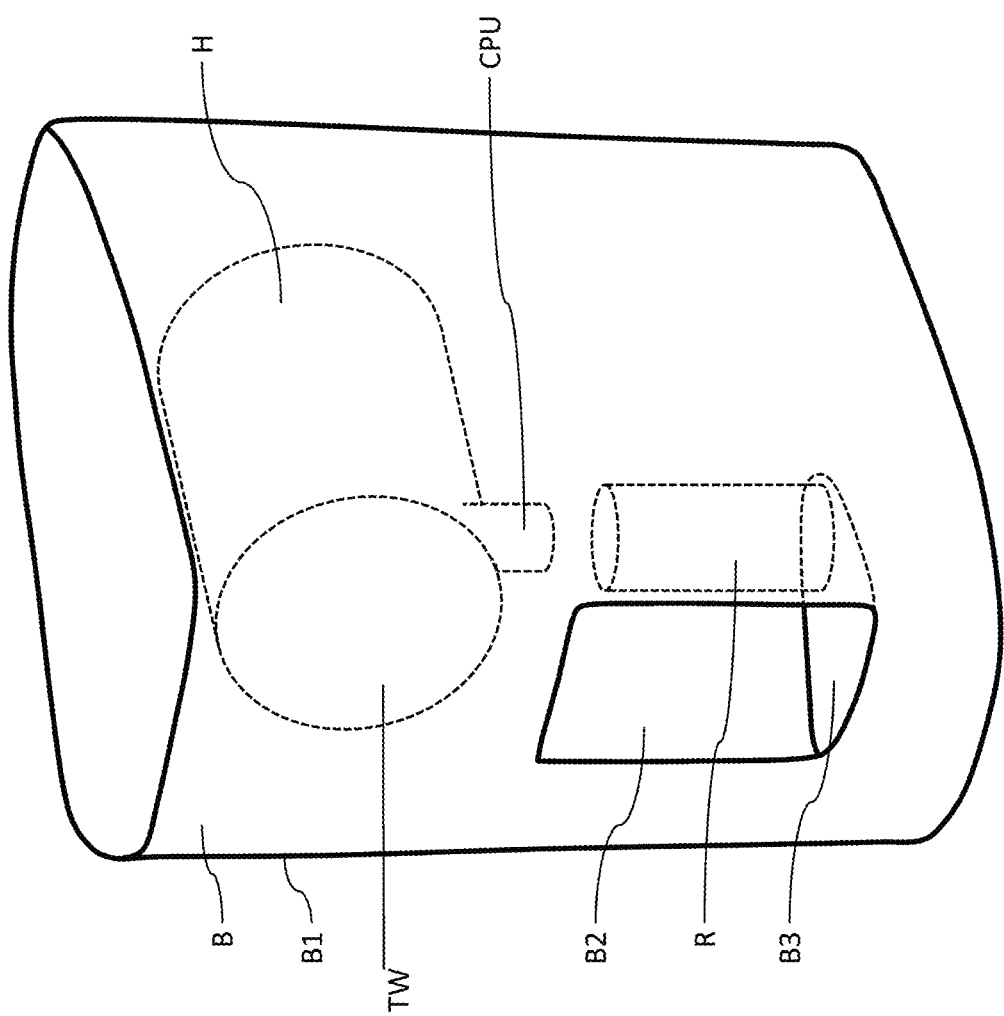
FIG. 1 schematically shows perspective view of an exemplary foamed product dispensing system according to an example of the invention.

In an exemplary embodiment, as shown in FIG. 1, a foamed product dispensing system includes a product dispensing machine B comprising a housing B1. In the present example the housing B1 (i.e. an external wall thereof) includes an opening B2, wherein the opening B2 provides access to a platform B3, wherein the opening B2 and platform B3 are configured for receiving a foamed product receiving receptacle R, e.g. a cup or a glass. Preferably, the opening/access is closable by a movable door D1 (depicted with a dashed line in FIG. 3B).

Figure 2:
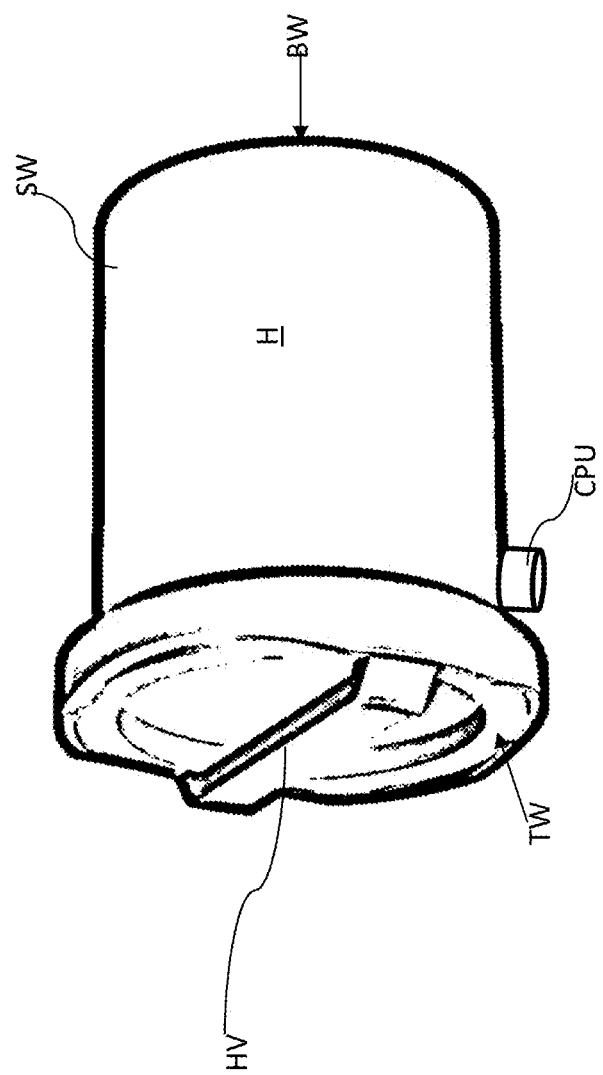
FIG. 2 shows a perspective view of a product container of the system of FIG. 1.

The exemplary system further includes an exchangeable product container H, provided with a product processing unit CPU (see FIG. 2). The CPU may be located on several positions. In the present advantageous example, the product processing unit CPU protrudes radially outwardly from the container. In particular, it extends through an outer wall of the holder H, in particular spaced-apart from a top wall TW and a bottom wall BW of the holder H. Moreover, as follows from the drawing, in this embodiment, the CPU is located near the top of the product container H.

In the present example, the product container H is a substantially cylinder-shaped or bucket-shaped capsule, for example having a rigid (e.g. metal or steel or rigid plastic, preferably fiber reinforced plastic) outer wall, being configured to be pressurized, e.g. to a pressure of at least 2 bar. A preferred length L of the capsule (measured between a top wall TW and bottom wall BW in the present example) is in the range of about 20 to 40 cm, wherein an external diameter X of the capsule (i.e. a diameter of a cylinder wall extending between the top and bottom) is in the range of about 10 to 30 cm. Also, it is preferred that the capsule H contains at least 4 liter or a least 4 kg product before initial use. A maximum weight of the capsule H (in an initial, filled condition) can be e.g. 20 kg. In an alternative embodiment, the capsule contains less than 4 liter, e.g. less than 2 liter, e.g. about 1.5 liter, before initial use.

Moreover, as follows from the drawing, it is preferred that the capsule/container H includes a gripping element, for example a handle HV, allowing a user to lift and hold the capsule with ease. In the example, the gripping element protrudes from a top wall TW of the container H, which top wall faces forwardly towards a front of the dispensing machine after placement of the container H in the machine.

Figure 3A:
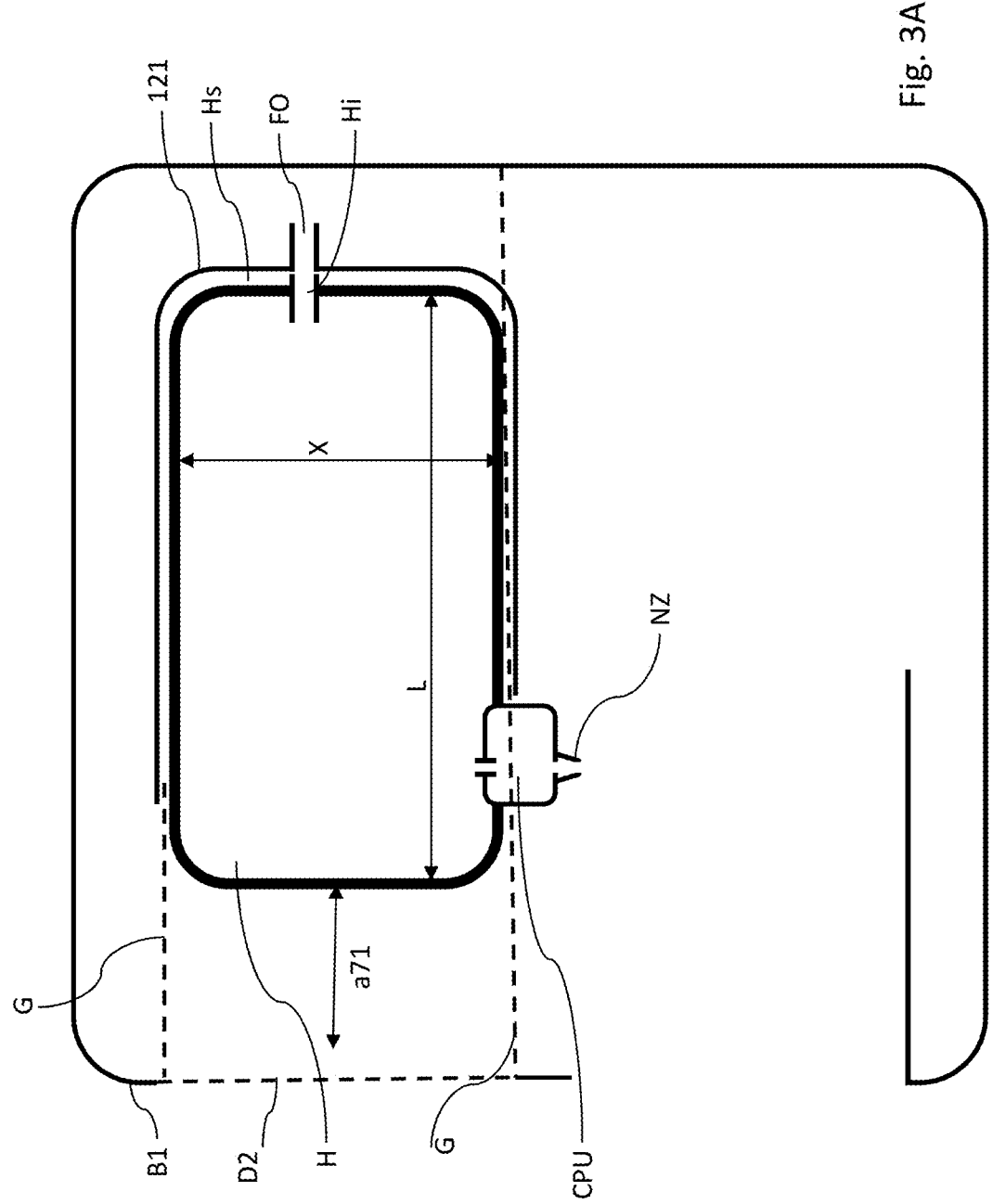
FIG. 3A shows a schematic vertical cross-section view of part of the system of FIG. 1, during unloading/loading a product container.

As shown in FIG. 3A, the dispensing machine B preferably comprises a container receiving space Hs (e.g. defined by or located within a respective wall structure 121) for receiving the container H. The dispensing machine preferably includes a container guide G (shown with dashed lines) for guiding the container H into and out of a container receiving space Hs of the machine (along a placement direction, indicated by an arrow a71). Preferably, the container receiving space in the housing B1 of the machine can be sealed or closed off from an environment of the housing, in particular allowing improved temperature control of the product container after loading. For example, the housing B1, and/or the afore-mentioned wall structure 121, may include a movable cover D2, e.g. a door for controlling access to the container receiving space Hs.

As indicated by arrow a71, the container H is preferably horizontally removable from the container receiving space Hs, e.g. for exchanging an emptied container with a filled container. Said container guide G can assist an operator in stably moving the container H towards a final position in the machine, and in the removing of a used-up container.

The machine can be configured such that placement of the container H in the container receiving space Hs causes one or more connectors of the machine B to connect to respective connectors of the container H. For example, container placement can cause a pressurizing fluid output connector FO of the machine B to be automatically connected to a fluid input connector Hi of the container H (for pressurizing an interior of the container). As a further example, such placement can cause a fluid injector connector FIc of the machine B to be connected to a fluid injector socket FIs of a product processing unit CPU of the container H, as will be explained in more detail below.

A removing of a container H from the machine can cause the one or more connectors of the machine B to become disconnected from the respective connectors of the container H. The machine B and/or the container H may include means for securing the container H in the container receiving space Hs, in order to prevent accidental and/or unauthorized removal of the container H from the container receiving space Hs, as will be appreciated by the skilled person.

The container H, in particular a product holding space (interior space, reservoir) thereof, can be filled with various types of product.

The product comprises, in particular, a food, for instance, a product safe for human consumption. The product comprises, for instance, one or more of: milk, cream, spray cream, cappuccino milk, or a dessert (for instance, a mousse forming product) or juice. The product can comprise a milk product, for instance, cream. According to an alternative embodiment, the foamable product comprises, for instance, a conditioner and/or cosmetic, and/or a cleaner, and/or, for instance, a body care product, a hair treating agent, or the like.

According to an advantageous elaboration, the product P present in the container H is a homogeneously foamable product, and in particular a food product, milk, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream or dessert, juice, more particularly a milk product. The product P can be, for instance, cream. The product P can optionally contain, for instance, a propellant or blowing agent (for instance, in a condition at least partly dissolved in the product), in particular a propellant consisting of one or more of: air, $N_2$, $N_2O$ and/or $CO_2$. Such a propellant or blowing agent is, in particular, safe with regard to food technology. The propellant or blowing agent can hold the inner space 4, for instance, at a particular super-atmospheric prepressure. Preferably, the product P does not contain a blowing agent.

Figure 3B:
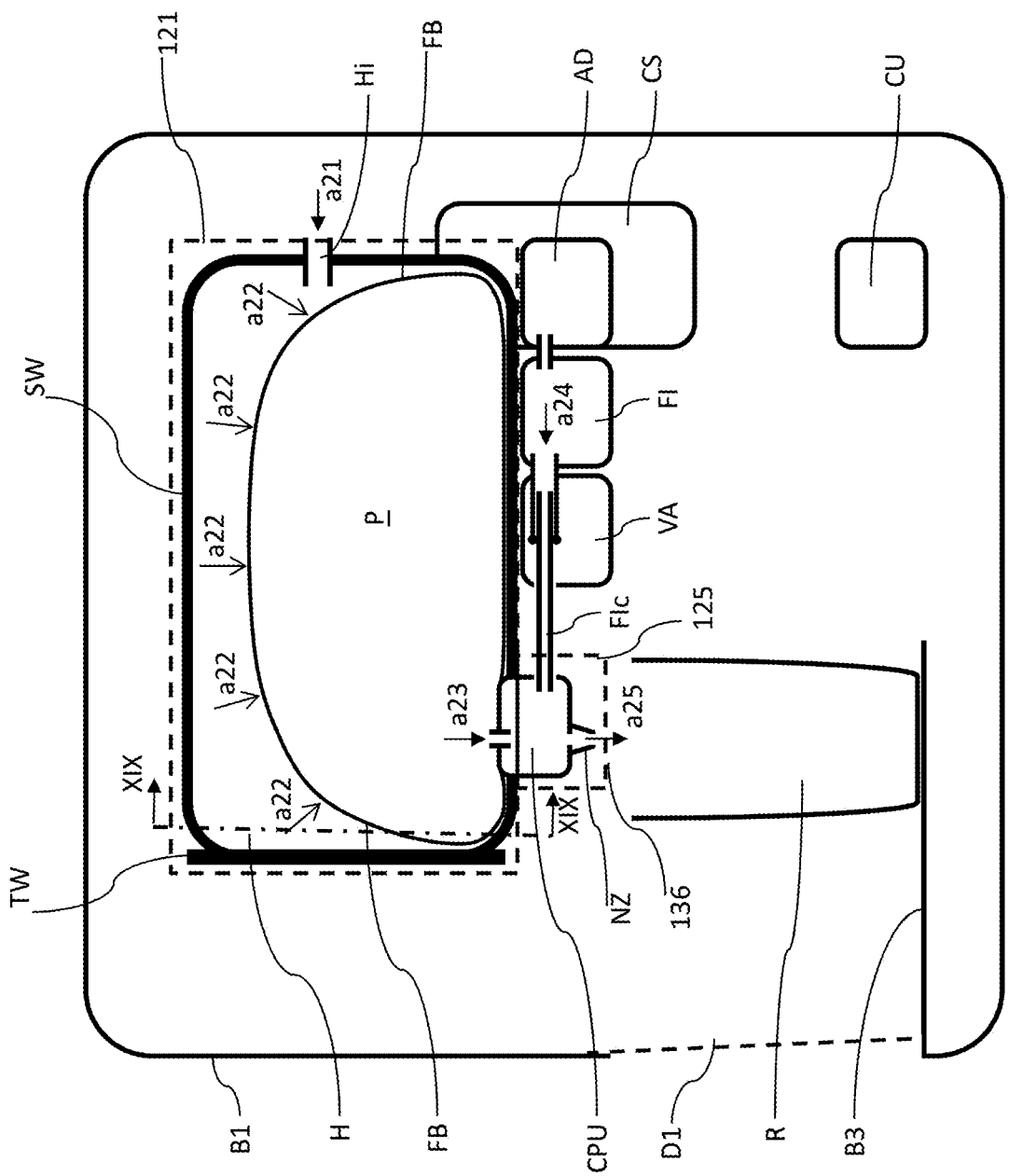
FIG. 3B is similar to FIG. 3A, showing further components of the system.
Figure 5:
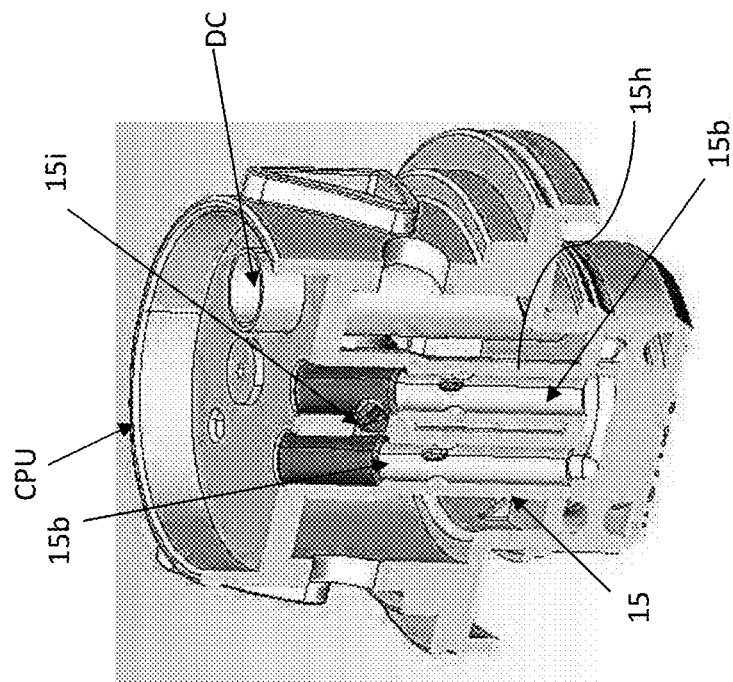
FIG. 5 shows a perspective view of first vertical cross-section of the CPU shown in FIG. 4, taken along centre lines of the two foaming chambers.
Figure 4:
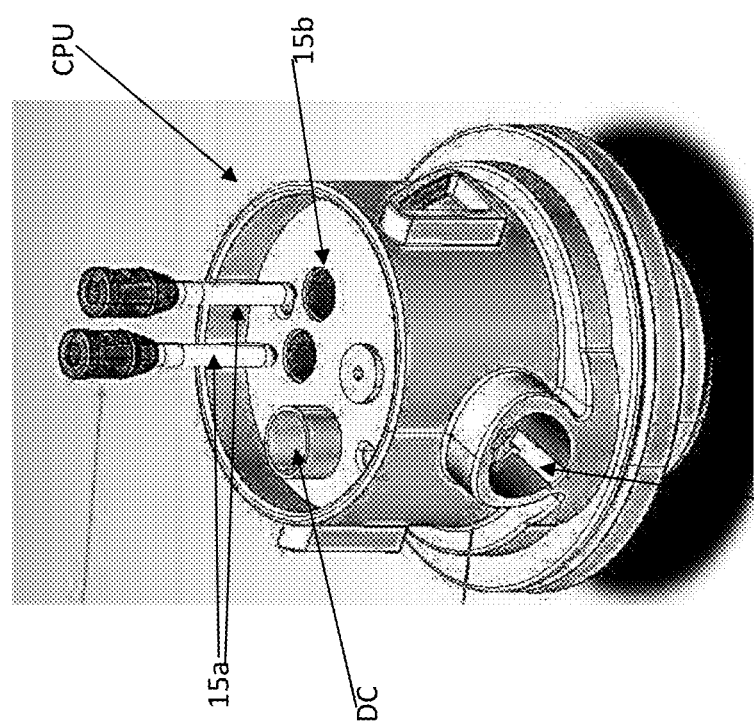
FIG. 4 shows a partly opened perspective upside-down view of the CPU of the product container of the system of FIGS. 1-3, wherein the microfiltration elements are shown exploded from two respective foaming chambers.

In FIG. 3B, an example of the container H is shown in more detail, containing a quantity of product P held in a flexible bag FB within the container H. During operation of the machine B, the container H is pressurized by the dispensing machine by a gas, e.g. air, being by the machine pumped through the fluid input Hi (as indicated by arrow a21), causing the interior of the container H to become pressurized at a super-atmospheric pressure. Consequently, pressure is exerted on the flexible product bag FB, as illustrated by arrows a22. The pressure, possibly in combination with gravity, causes the product P to flow (indicated by arrow a23) from the flexible bag FB into the downstream product processing unit CPU, that is, in case a valve or seal of the product processing unit CPU is brought to an operational state providing a product flow connection towards a respective product processing space (as will be explained below), discharging foamed product via a respective outlet (indicated by arrow a25).

The flexible bag FB as such can have various configurations and shapes. For example the bag can be made of one or more flexible layers of one or more plastic or plastic substances, and/or of one or more flexible layers of paper or paper substances, and/or one or more flexible layers of metal or metal substances (e.g. aluminium). The flexible bag can be entirely flexible but that is not required. It can e.g. include or more foldable bag sides that fold inwardly during product discharge. In particular, the flexible bag FB is configured to allow a bag volume decrease during discharging product from the bag FB.

In yet a further embodiment, the product processing unit CPU and the flexible bag FB are integrally joined with each other (into an assembly). For example, a top wall or top section of the product processing unit CPU can be made in one piece, or welded or glued to, the flexible bag, or joined to the bag FB in another manner. The assembly of the product processing unit CPU and bag FB are removably held by an outer part SW (shell) of the container H. For example referring to FIG. 2, the top wall TW of the container may be a removable cover, that can hermetically seal the interior of the container H (in a gastight manner) when the cover wall TW is in the depicted closed position (e.g. located on top of a side wall SW). The top wall TW can be removed from a remaining container part SW, allowing access to the flexible bag FB that is located in the container H. Then, preferably, the flexible bag FB and its processing unit CPU can be removed from the container (e.g. after use, e.g. when the bag is empty), to replaced with a fresh product containing flexible bag and respective processing unit CPU. After the new filled flexible bag FB and CPU have been properly position within the container shell, the top wall TW can be installed again for hermetically sealing the container again (allowing pressurization of the container interior and respective flexible bag FB). In this embodiment, in particular, the exterior SW of the container H can act as a bag positioning structure, for installing and holding a flexible bag (and its CPU) in a desired operation position within the machine B. The container shell (i.e. the outer wall SW of the container) itself can be made of a rigid material. A single container shell SW can be used to subsequently operate with a number of replaceable flexible bag-CPU assemblies. This also leads to advantages concerning transport and storage, since a relatively large number of flexible product container bags FB can be transported and/or stored in a relatively small transport resp. storage space (whereas transporting a large number of rigid outer container shells can require more space).

In one embodiment, a container H that includes a flexible bag FB (as in the above example), wherein the exterior walls TW, SW of the container H act as a bag pressurization chamber, is entirely removable from the machine B.

In an alternative embodiment, only the flexible bag-CPU-assembly are removable from the machine B, e.g. when the container H has been opened by removing the lid/cover wall TW, leaving an outer part SW of the container in the machine B during the exchange of the bag. In such an embodiment, the flexible bag-CPU-assembly as such can be called the "exchangeable product container", to be placed in a pressurization chamber of the machine B. In yet another embodiment of the invention, the product container as such can have a fully or at least partly flexible outer wall, the product container being placed in a dedicated pressurization chamber of the machine B during operation.

FIG. 3B further shows the machine B to include an optional air dryer AD for supplying dried air, e.g. dried ambient air.

The air dryer AD may be embedded in or forming part of a cooling system CS of the machine B, for example a cooling system CS configured to cool the product container H as well. During operation, the dried air is preferably received from the air dryer AD by a fluid injector FI, which is configured to supply the dried air into the product processing unit CPU via a fluid injector connector FIc (indicated by arrow a24).

According to a highly advantageous embodiment, the fluid injector connector FIc preferably is integrated with or forms part of a valve actuator VA (see FIG. 3B) of the dispensing machine. The valve actuator VA is configured to actuate a valve member 50 (see FIGS. 7-10) of the product processing unit CPU through actuation, e.g. rotary actuation, of the fluid injector connector FIc. A respective valve actuator can be configured in various ways and may include a servo motor, electromotor, electromagnetic actuator or other drive means.

With further reference to FIG. 3B (see also FIG. 10), the product processing unit CPU is configured to mix the product P with the dried air as they are being supplied to the product processing unit CPU, resulting in a foamed product being discharged from the product processing unit CPU, as indicated by arrow a25. A product discharge channel of the CPU can terminate e.g. via a product shaping nozzle NZ, e.g. having an array of product-shaping teeth or the-like (known a such). During use, a receptacle R, e.g. a glass or cup, may be exchangeably placed near, e.g. under, the product processing unit CPU—onto the respective platform B3—for receiving the discharged foamed product.

The machine H may be provided with a control unit CU being configured for controlling fluid flow and product flow to the processing unit CPU, for example by controlling activation and deactivation of fluid flow means (e.g. a pump, servo, motor etc.). Further, the control unit CU can be configured for controlling a position of the CPU valve member 50 through the respective valve actuator VA. Preferably, in case of initiating a product discharge, the control unit is configured to start fluid flow before product flow. The control unit is preferably at least partly user operable via a user interface or operating device (not shown) of the machine B, e.g. via a touch display, control knob, switch or the-like.

Figure 8:
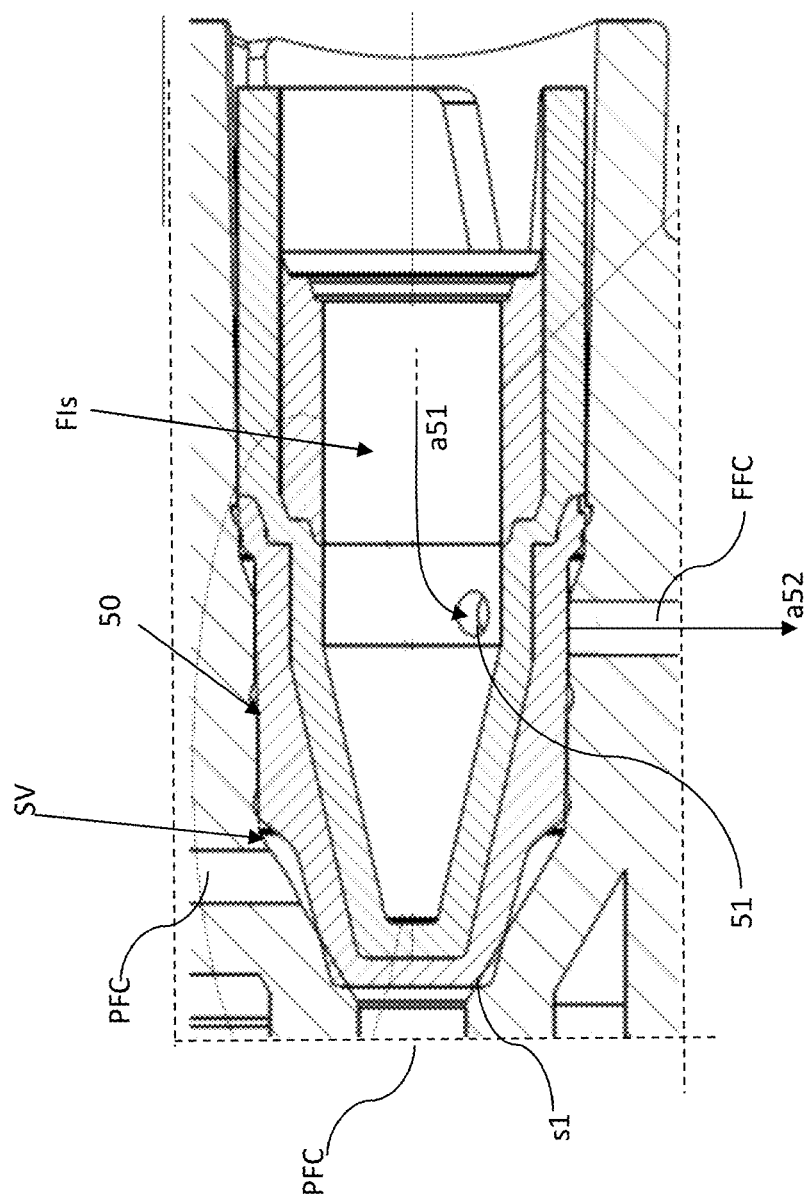
FIG. 8 is a vertical cross-section of the valve section of the CPU of the embodiment of FIGS. 1-7, wherein the valve is in a closed state.
Figure 9:
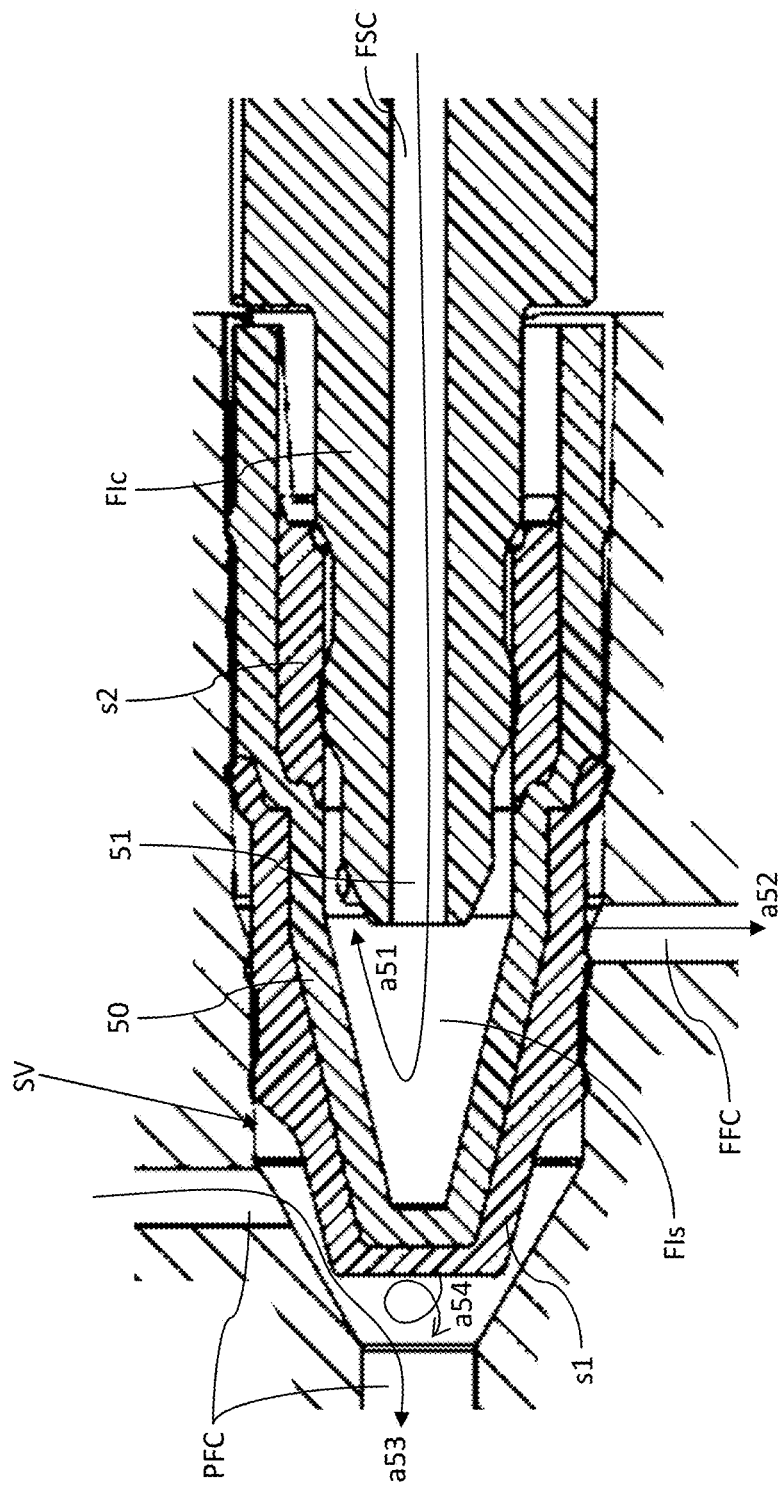
FIG. 9 is a similar cross-section as FIG. 8 wherein the product dispensing machine has moved the valve to an opened state.
Figure 10:
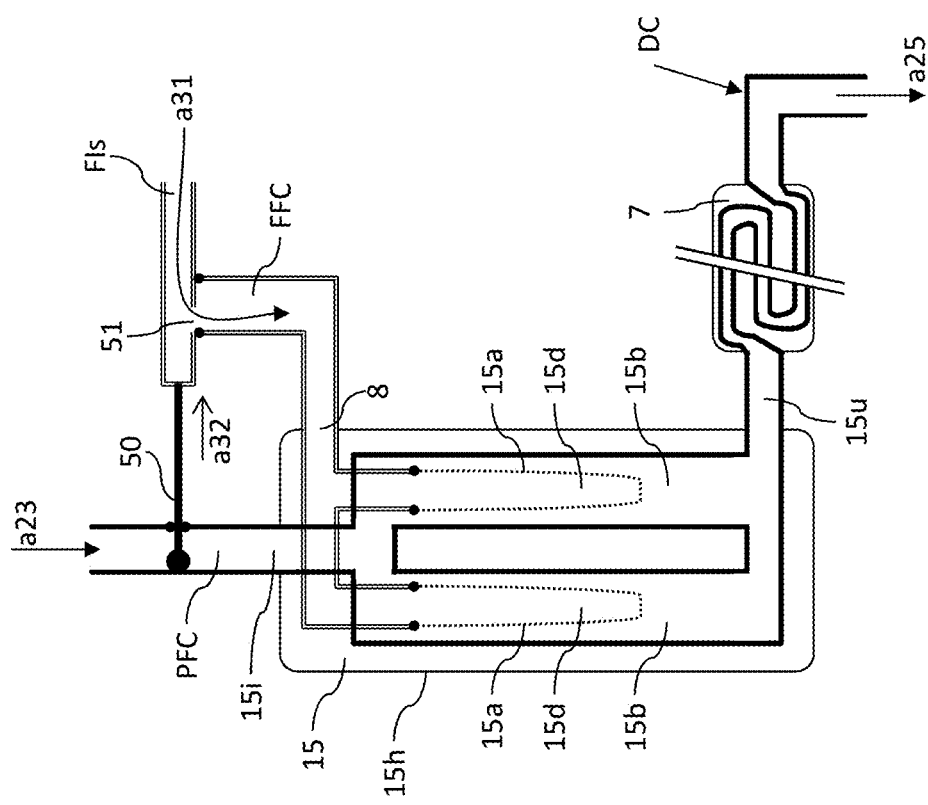
FIG. 10 shows a diagram of flow paths of the system of FIGS. 1-9.

FIGS. 4-9 depict the product processing unit CPU of the system, in more detail (see also FIGS. 12-14A, 14B). The CPU is part of the afore-mentioned product container H, and is connected to the interior of the flexible bag for receiving product there-from (as in FIG. 3B). FIG. 10 shows the CPU in a more schematic way, indicating product and fluid (gas) flows during product discharge as well.

The unit CPU is configured to receive a flow of product P into a product feedthrough channel PFC as indicated by arrow a23. The product feedthrough channel PFC is preferably closeable by a valve member 50: FIG. 8 shows the valve member 50 in a closed state, blocking flow through the product feedthrough channel PFC. The opened position of the optional valve member 50 is shown in FIG. 9. The valve member 50 is not depicted in FIGS. 4-7.

The processing unit CPU is further configured to receive fluid, e.g. dried air, into a fluid feedthrough channel FFC, e.g. from a fluid injector FI through a fluid injector connector FIc. Advantageously, the valve member 50 includes a fluid injector socket FIs for connecting to a fluid injector connector FIc, and a fluid passage 51 for providing fluid communication between the fluid injector socket FIs and the fluid feedthrough channel FFC (as indicated by arrow a31). In the example, the fluid passage 51 is a bore or through-hole, extending laterally through the valve member 50 (one or more such fluid passages 51 may be provided if desired).

FIGS. 4-7 shows the product processing unit CPU (in a perspective, partly opened upside-down view) comprising a frothing device 15, for example a microfiltration device 15. A housing 15h of the microfiltration device 15 can be an integral part of the CPU, and it can comprise a product entrance 15i connected to the product feedthrough channel PFC, downstream of the valve member 50, and a gas inlet 8 connected to the fluid feedthrough channel FFC, downstream of the fluid passage 51. The microfiltration device 15 further comprises at least one filtration wall 15a (two, in this example) having gas transmissive pores, for instance, a tubular wall, which separates a respective gas supply space 15d associated with the gas inlet 8 from a foaming channel 15b. Preferably, the length, measured in a product flow direction, of the foaming channel 15b is approximately 2 or 3 cm. Preferably, the gas transmissive pores of the filtration wall 15a have a pore size of between 0.2 and 1.5 microns. It has been observed that good results can be achieved e.g. with a pore size of about 0.2 microns. According to an embodiment, the sizes of individual pores may vary within a certain range, for example from below 0.1 microns to above 20 microns. Alternatively or additionally, pore sizes in the range of 5 microns to 10 microns can provide good foaming properties.

In some embodiments, but not necessarily in all embodiments, good results have been achieved in case the microfiltration wall, in particular a product facing side of the microfiltration wall, includes a hydrophobic and/or oleophobic material, e.g. PFTE, to prevent or reduce clogging of the microfiltration wall by product entering or adhering to the pores.

In the present drawings, the microfiltration device 15 comprises two tubular filtration walls 15a, each providing respective gas supply spaces 15d and foaming channels 15b in the housing 15h. The tubular filtration walls 15a are shown exploded from the housing in FIG. 4, and are not depicted in FIG. 5. Each of the tubular filtration walls 15a preferably has a proximal gas inlet (connected to the fluid feed-through channel) and has preferably been closed off at a distal end, as in this example. It follows that the CPU is designed such that said fluid feed-through channel FFC terminates into each of the tubular filtration elements 15a (as in FIG. 10), to feed the interiors 15d of the tubes 15a with gas (e.g. dry air), to be mixed into the product. The number and dimensions of filtration walls 15a, gas supply spaces 15d and foaming channels 15b may be implemented according to general knowledge depending on material properties, required flow rates and/or other variables.

In a preferred embodiment, the system includes a choked gas supply (e.g. at and/or upstream of the fluid injector FI) for supplying gas at a substantially constant flow rate to the processing unit CPU during operation. In particular, as will be explained below (see FIG. 17), the choked gas supply can include a flow constriction 89, wherein a relatively high gas pressure is applied upstream of the flow constriction (e.g. a pressure higher than 5 bar), the configuration being such that a constant gas flow rate (in particular mass flow) can be obtained downstream of the flow constriction. In particular, during operation, a resulting choked flow exit velocity of the gas at the constriction 89 can be at or near sonic conditions, i.e., at or near a Mach number of 1. By application of a choked gas supply, clogging of components of the downstream frothing device (e.g. of said microfiltration device) can be prevented or reduced, and even if such clogging would occur, negative effects of such clogging can be efficiently suppressed. For example, the choked gas supply may be configured to produce a resulting gas pressure in the frothing device in the range of 1.5 to 4.9 bar, preferably in the range of 2.7 to 3.8 bar. During a certain operational period (in particular a period of foaming and discharge a relatively large amount of the product), the resulting gas pressure in the frothing device may gradually increase within a said pressure range, e.g. depending on an increased resistance due to filtration wall clogging.

FIGS. 6, 7, 10 further shows the product processing unit CPU comprising a processing device 7, arranged downstream of the microfiltration device 15, for performing a mixing treatment and/or pressure reduction treatment of the product provided with gas. The processing device 7 is preferably configured to cause a controlled pressure reduction, to a pressure that is close to or is atmospheric pressure. Preferably, the processing device 7 comprises a labyrinth type fluid path being long, e.g. approximately at least 20 cm or at least 30 cm, and/or narrow and/or curved, at least compared to other fluid paths of the processing unit CPU, e.g. compared to the at least one foaming channel 15b. Downstream of the processing device 7, the processing unit CPU includes a discharge channel/opening DC for discharging the product provided with gas, for example along the direction of arrow a25, via a nozzle NZ.

The present CPU includes a socket/seat SV for receiving the valve member 50, whereas the valve member 50 itself includes a socket FIs for receiving the fluid injector/actuator member FLc (see FIG. 8-9).

FIG. 8 shows that the present valve member 50 of the CPU includes a fluid passage 51 and a fluid injector socket FIs. As follows from the drawings, the fluid passage 51 of the valve member 50 coincides with (and in this example, is in parallel with) an axis of rotation of the valve member 50.

The valve member 50 may be held into this closed state by the fluid injector connector FIc (shown in FIG. 9) of the machine. In this state, flow through the product feedthrough channel PFC is blocked by the valve member 50. In particular, a sealing element s1 of the valve member 50 is configured to provide a sealed closure between the valve member 50 and its valve seat (e.g. providing walls of the product feedthrough channel PFC). In the present embodiment, the same sealing element s1 is also configured to provide a sealed closure between the product feedthrough channel PFC and the nearby fluid feedthrough channel FFC (and remains providing such a seal when the valve member has been moved to the opened valve state, see FIG. 9). It will be appreciated that separate sealing elements may be used instead of a single combined sealing element s1.

Preferably, the fluid feedthrough channel FFC is already open for feedthrough of fluid (e.g. dry air), injected by the fluid injector FIc, when the valve member 50 is still in its closed position. This allows for starting fluid flow prior to product flow. This is indicated by arrow a52 in FIG. 8.

In FIG. 9, the fluid injector connector FIc of the machine, having a fluid supply channel FSC, is shown as being received in the fluid injector socket FIs of the valve member 50. Also, the fluid injector connector FIc has engaged the valve member and has moved the valve member 50 from its valve seat towards the opened valve state. In particular, this movement can involve both rotation and translation of the valve member (e.g. a helical movement, a twisting of the valve member). It should be noted, that the fluid injector connector FIc is preferably also in engagement with the valve member in the initial state when holding the valve member in the closed position (of FIG. 8).

Once the valve member 51 has moved to its opened state, the product feedthrough channel PFC is opened for allowing product flow (from the container bag) towards the microfiltration device of the CPU, as indicated by arrow a53.

Preferably, a further sealing element s2 is present, to provide a gastight sealed closure between the fluid injector socket FIs (particularly the fluid passage 51) and the fluid injector connector FIc. Hence, the injector FIc can inject fluid, e.g. dried air, may via the fluid supply channel FSC through the fluid passage 51 of the valve member into the fluid feedthrough channel FFC of the CPU (see arrows a51 and a52).

The CPU valve member 50 and the fluid injector connector (actuator element) FIc are configured to releasingly engage one-another, for allowing valve actuation, which can be achieved in various ways. For example, the elements can interact via a clicking or clamping connection, via a bayonet-type lock or in a different manner. Preferably, a homo-kinetic clamping can be achieved, allowing for some play during placement of the container into the machine.

As indicated by arrow a32 in FIG. 10, the valve member 50 may be moved to an opened state for allowing flow through the product feedthrough channel PFC. FIG. 10 also indicated, as is mentioned before, that fluid injection (along arrow a31) is preferably possible regardless of the valve member 50 being in either an opened state or a closed state.

Figure 11B:
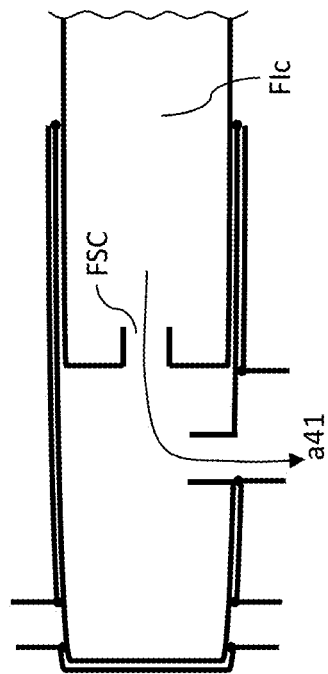
FIGS. 11a-11d show schematic diagrams of different CPU valve member states.
Figure 11A:
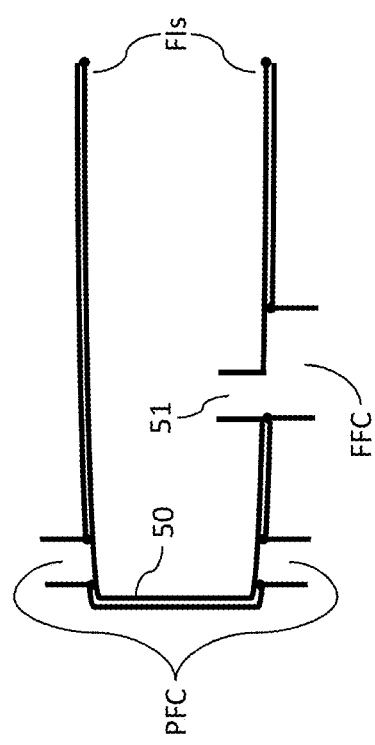
Figure 11D:
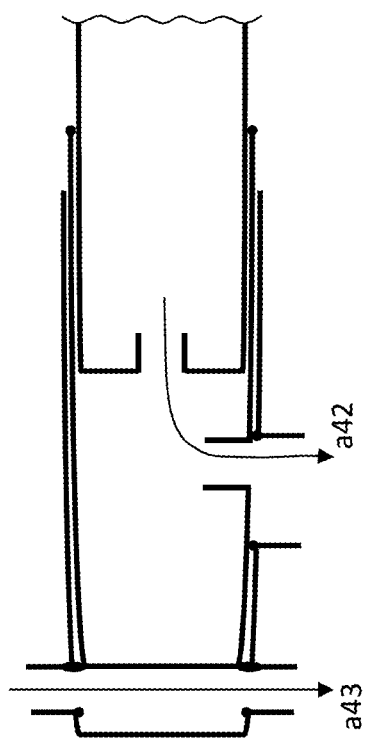
Figure 11C:
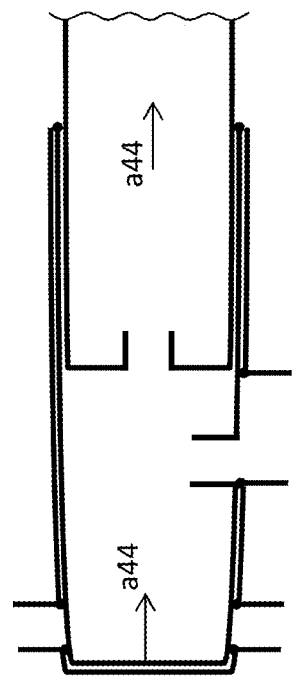

In a further elaboration of an exemplary embodiment, FIGS. 11a-11d show schematic cross section views of a valve member 50 including a fluid passage 51 and a fluid injector socket FIs, a product feedthrough channel PFC and a fluid feedthrough channel FFC, wherein FIGS. 11b-11d also show a fluid injector connector, wherein FIGS. 11a-11d show different configurations related to different states of the system. In FIGS. 11a-11d, sealing elements for providing sealed closures between components are indicated schematically by dots. The skilled person will be able to apply appropriate sealing elements according to general knowledge, depending on relevant system variables. In the case of a sealed connection between two components, sealing elements may be fixed to either or both components.

In FIG. 11a, the valve member 50 is shown in a closed state, blocking flow through the product feedthrough channel PFC, while providing a fluid connection between the fluid injector socket FIs and the fluid feedthrough channel through the fluid passage 51.

In FIG. 11b, the fluid injector connector FIc is shown as being received in the fluid injector socket FIs, wherein the fluid injector connector FIc is sealed by a sealing element e.g. of the fluid injector socket FIs for providing a sealed fluid connection between the fluid injector connector FIc, particularly the fluid supply channel FSC, and the fluid feedthrough channel FFC of the product processing unit CPU through the fluid passage 51 of the valve member 50, as indicated by arrow a41.

In FIG. 11c, the valve member 50 is shown to be actuated, preferably through actuation of the fluid injector connector FIc by the valve actuator VA (not shown in FIG. 11). The actuation is preferably a substantially helical (twisting) actuation, wherein the valve member 50 is configured to receive a rotary actuation force from the fluid injector connector FIc. A a result, the valve member 50 rotates around a rotation axis and—at the same time—linearly translates along the rotation axis). The axis of rotation can be substantially aligned with a central axis of the valve member 50 and a central axis of the fluid injector connector FIc. The product processing unit CPU can be configured to enable a substantially helical movement (i.e. a combined rotary and linear movement) of the valve member 50.

In other words, the valve member 50 and the product processing unit CPU can be configured so that a substantially rotary actuation of the valve member 50 causes a substantially helical movement of the valve member 50, which helical movement includes a linear movement component. The arrows a44 indicate the direction of the linear movement component. In FIG. 11d, the valve member 50 is shown in an opened state after having been actuated as described above. The opened state of the valve member 50 allows a flow of product P through the product flowthrough channel PFC along the direction of arrow a43. Meanwhile, a fluid connection between the fluid supply channel FSC and the fluid feedthrough channel FFC through the fluid passage 51 has been maintained throughout the actuation and is still maintained while the valve member 50 is in an opened state as in FIG. 11d, as indicated by arrow a42.

As said, the valve member 50 may be substantially rotated between an opened state and a closed state. An angle of rotation of the valve member 50 between an opened state and a closed state may be larger than 20 degrees, preferably in the range of 45 to 180 degrees, for example 90 degrees.

It will be appreciated that the state of the valve member 50 may be changed from the opened state to the closed state by reversing the procedure described above, including a reversing actuation. Both the opening and closing procedures are preferably automatically controlled by the control unit CU of the machine B, e.g. depending on a programmed dispensing of a certain amount of product.

Since the product valve member 50 is part of the replaceable product container, contamination of the dispensing machine itself (with product) can be prevented. The valve actuator of the dispensing machine simply connects to the CPU of the installed product container H, to control product flow and also to inject the gas (for example dried air) into the CPU for foaming the product via the respective microfiltration device. Moreover, the dispensing machine can automatically pressurize the content/interior of the product holder after the container has been loaded into the machine, for maintain the flexible bag at a certain pressure, allowing for a swift start of a product dispensing run. Once a product container has become empty or has to be replaced or discarded, the product container can be removed from the machine, wherein the product valve member 50 releases from the machine actuator, preferably remaining in its closed valve state, preventing further chance of contamination.

Moreover, by providing the microfiltration device with two tubular filtration walls 15a, operating in parallel, a good, controlled food product foaming—at a relatively high throughput—can be achieved using compact means. In particular, in this way, application of a relatively long tubular filtration wall can be prevented, allowing form more precise control of the foaming process with a relatively low chance of channel clogging.

FIGS. 16a-c show perspective views of product flow paths and fluid flow paths in the CPU according to a preferred exemplary embodiment (depicted in FIG. 12), wherein FIG. 16c shows an upside-down view with respect to FIGS. 16a-b. Reference signs have been added to indicate where some corresponding CPU elements are positioned with respect to the flow paths that are shown. In these figures, product flow paths are shaded light gray, whereas fluid flow paths are shaded dark gray. Flow directions have been indicated with arrows, where dashed-line arrows p1-p7 indicate subsequent product flow path directions and solid-line arrows g1-g4 indicate subsequent fluid flow path directions. It is noted that in these figures, product flow paths include flow paths of product provided with gas, i.e. flow paths downstream of the frothing device 15. It is also noted that not all arrows are shown in all of the FIGS. 16a-c.

At arrow p1, product flows from the product container into the product flowthrough channel PFC of the CPU. At arrow p2, product flows past the valve member 50 when the valve member 50 is in an opened state. At arrows p3, product flows through the frothing device 15 where the product is provided with gas. At arrows p4, the product provided with gas enters processing device 7 for pressure reduction and/or mixing. At arrow p5, the product provided with gas enters a downstream section of the processing device 7. At arrow p6, the product provided with gas flows towards the discharge channel DC, to be discharged along the direction of arrow p7.

At arrow g1, gas enters the CPU through a fluid passage of the valve member 50 to flow into the fluid flowthrough channel FFC along arrow g2, continuing along arrows g3. At arrows g4, the gas approaches two microfiltration walls 15a of the frothing device 15, after which it passes through the walls 15a to enter into the stream of product and continue as part of the product provided with gas.

For food safety purposes, depending on the specific product being contained in the container, it may be beneficial to prevent contamination of the CPU and/or the product in the product container before use, e.g. during transport and handling. In particular, it may be required that contact between the product and ambient air be prevented during those times. It may also be required that the interior spaces of the CPU are sealed off from ambient air to prevent e.g. condensate forming in those spaces with associated hygiene issues. In view of this, the CPU may be provided with sealing means for blocking ambient air from entering the CPU and/or from coming in contact with the product.

In particular, in an embodiment which may be carried out independently from the other embodiments, a downstream section of the CPU may be provided with an airtight sealing cap. In particular, the product processing unit CPU can be provided with an airtight sealing cap 71 configured to seal a downstream product discharge area 128 of the product processing unit CPU from an environment, before initial use. For example, the downstream discharge nozzle NZ may be located within the sealed downstream product discharge area 128 (see FIG. 12).

Figure 12:
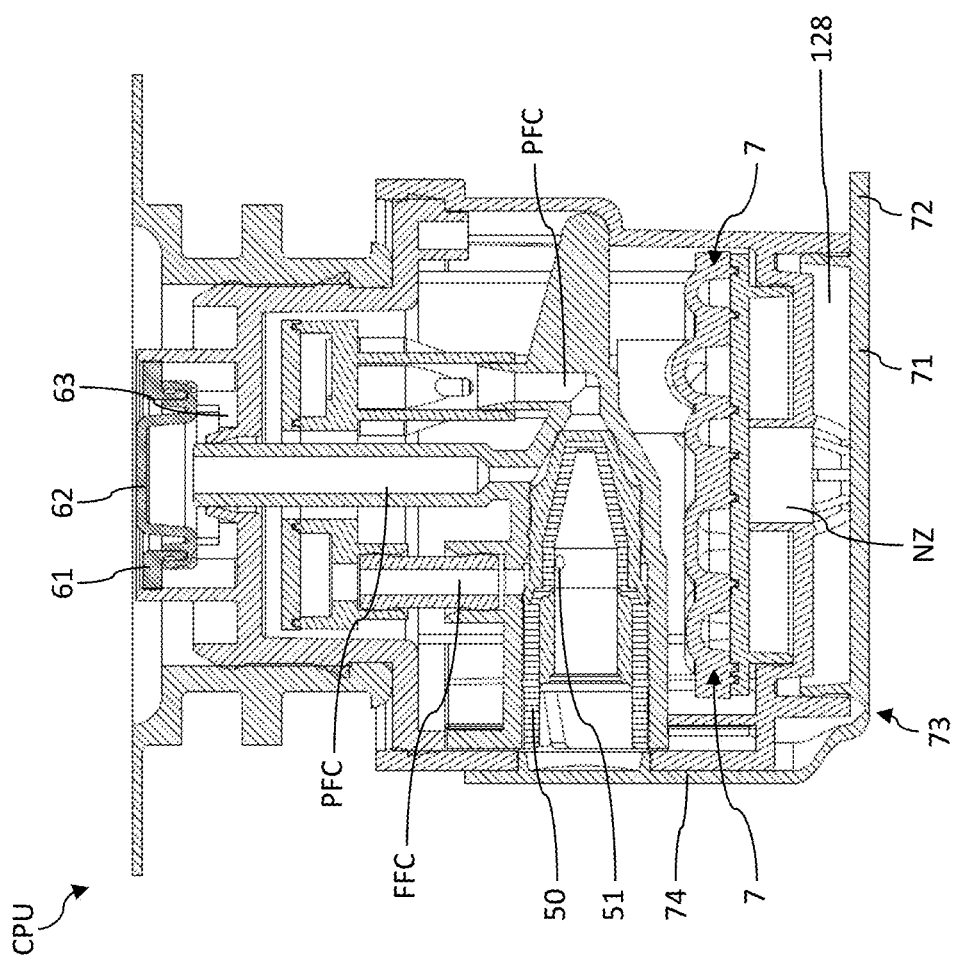
FIG. 12 shows a cross-sectional view of a further embodiment of the CPU, provided with sealing means.
Figure 13:
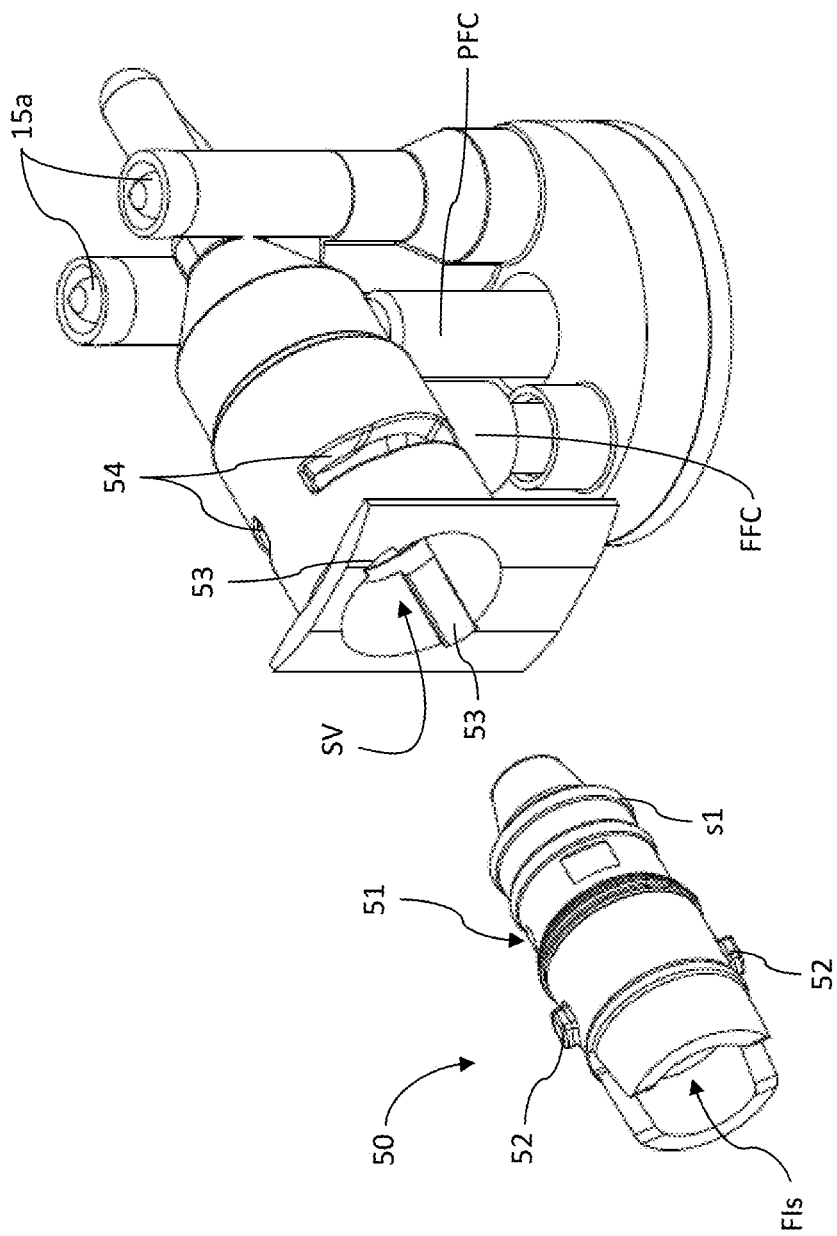
FIG. 13 shows an exploded perspective view of components of the CPU including a valve member.
Figure 14B:
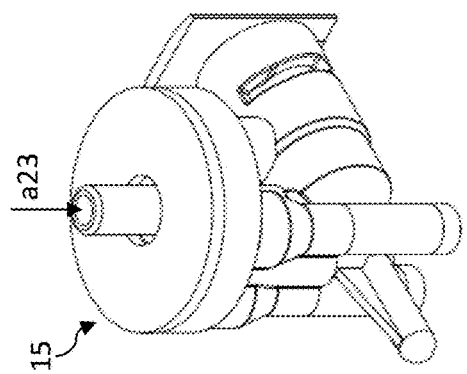
FIG. 14B shows an assembled state of the CPU components.
Figure 14A:
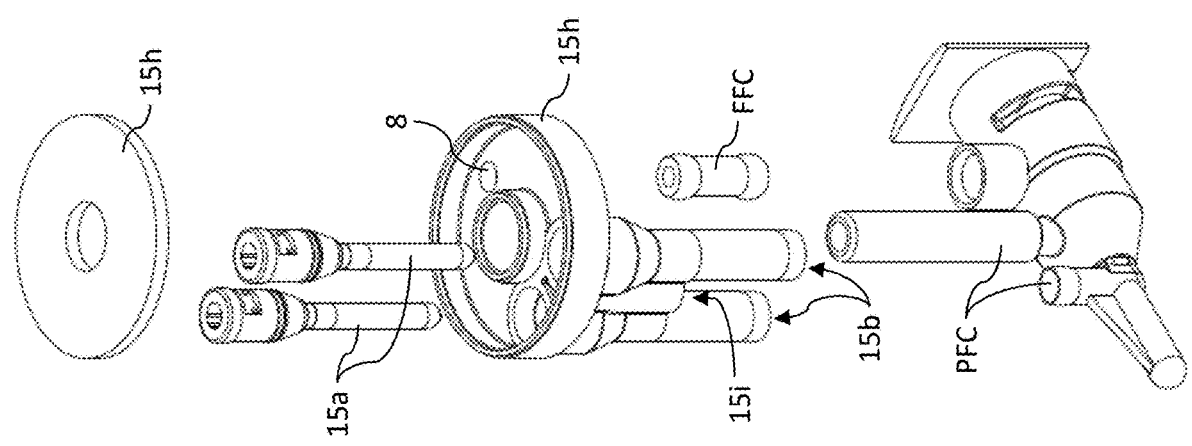
FIG. 14A shows an exploded view of components of the CPU, shown in FIG. 13.
Figure 15B:
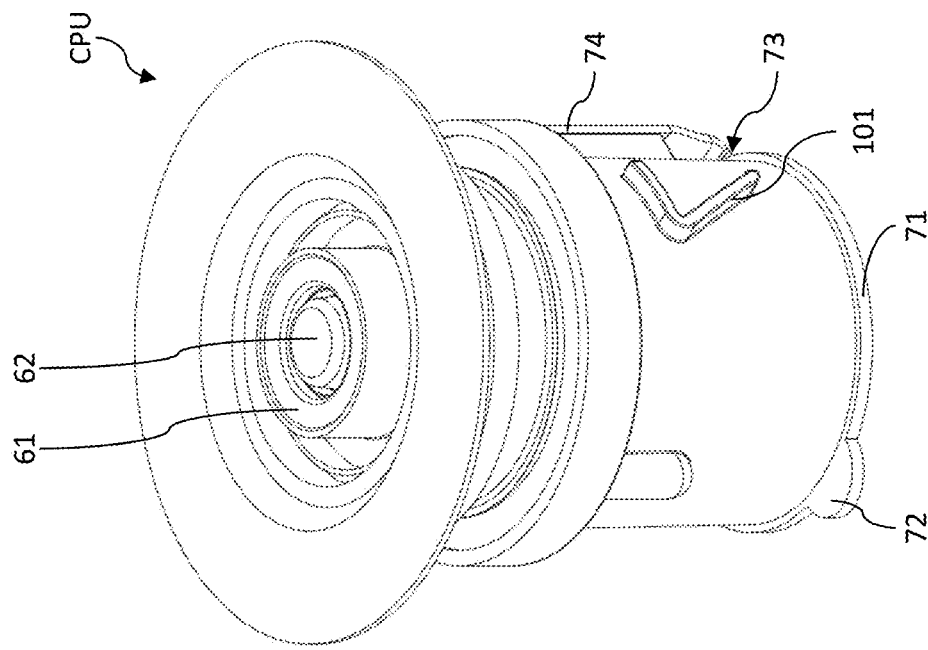
FIGS. 15a-b show perspective views of the CPU shown in FIG. 12, from two different viewing directions.
Figure 15A:
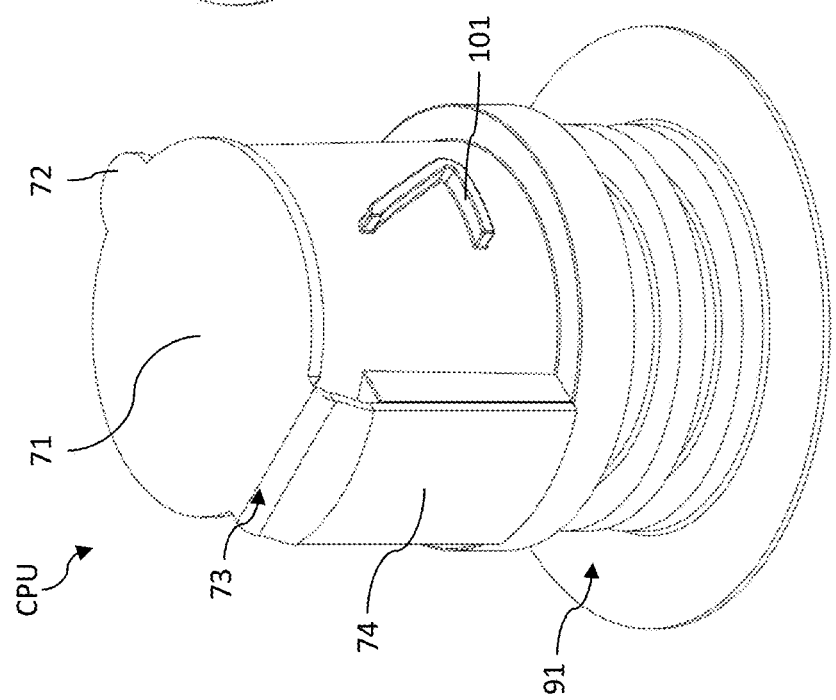

The sealing cap can be configured in various ways. As shown in FIGS. 12, 15*a* and 15*b*, the sealing cap may e.g. include a first section 71 and an optional second section 74 that is linked to the first section, e.g. via a (film) hinge 73, wherein preferably at least one or both of the sections is/are provided with a gripping element, e.g. a handle 72. Said optional hinge 73 may be, for example, an integral (one-piece) flexible section of the sealing cap.

In this example, the first cap section 71 is configured to seal off the downstream area 128 and can cooperate with an opposite rim of the CPU to form the respective airtight seal.

Further, in this example, the second cap section 74 may be configured to seal off a second external opening of the CPU, the second opening being a gas supply opening of the gas supply FIs (see FIG. 12).

The sealing cap may be configured to be removed by a user at or around at time when the product container is inserted into the dispensing machine: first the handle is pulled to rotate the first section about the hinge and to release the first section from the CPU; then the sealing cap is pulled further to release the second section from the CPU.

In this example, a single cap includes both sections 71, 74 for sealing two different external openings of the CPU. Alternatively, the cap sections 71, 74 can be separate cap sections (that are not directly linked to each other).

In another embodiment, which may be carried out independently from other embodiments but may also be combined, the CPU may be provided with an airtight (e.g. pressure controlled) seal 61, 62 at an interface between the CPU, in particular the entrance of the afore-mentioned product feedthrough channel PFC, near or adjacent to the interior product containing space of the product container H. In this example, in a closed state, the seal is generally in direct contact with the contents of the product containing space, i.e. for example the product, preventing entry of product into the CPU and in particular preventing entry of e.g. air or gas from the CPU into the product that is held in the interior space of the container H.

Figure 15C:
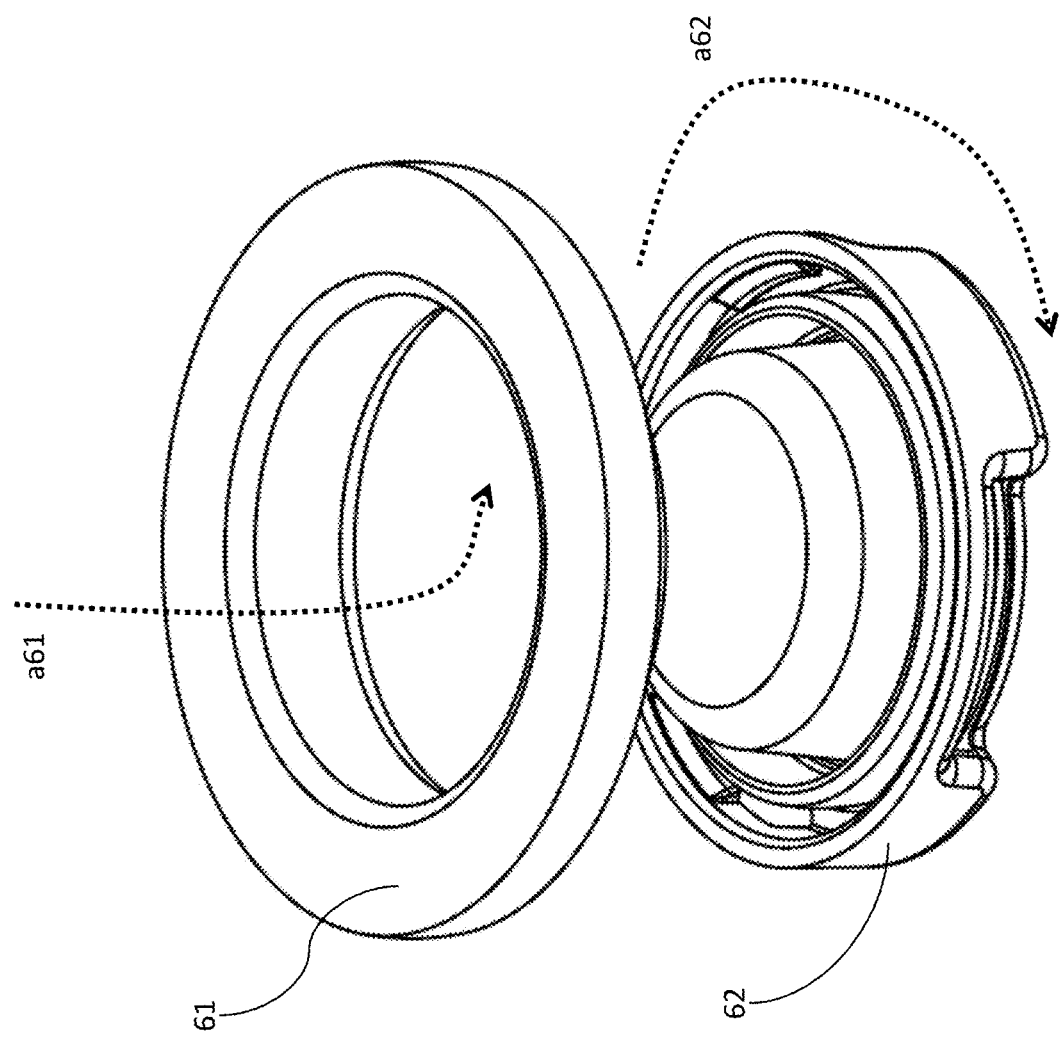
FIG. 15c shows a perspective view of a seal of the CPU of FIG. 12 in more detail.

As shown in FIGS. 12, 15*b* and 15*c*, in this example the seal is a pressure controlled seal that includes a ring 61 and a cap 62, wherein, in a closed state (as shown in FIGS. 12 and 15*b*), the ring and the cap form an airtight seal, and, in an opened state (as shown in FIG. 15*c*) a passage for product flow is provided between the ring and the cap as indicated by arrow a61. Since the location of the pressure controlled seal may be hard to access for a user and since hygienic operation of the seal is desired, the pressure controlled seal is preferably configured to open under a pressure exerted by contents of the product container when the product container is pressurized. Thus, opening of the pressure controlled seal is controlled by controlling a pressurization of the product container. The ring and the cap are preferably configured so that the cap breaks away from the ring at a predetermined super-atmospheric opening pressure or opening pressure range. In order to prevent that the broken-away cap should block a product flow into the product feedthrough channel PFC, the CPU may be provided with ribs 63 between the pressure controlled seal and an entrance of the product flowthrough channel PFC, so that the cap rests on the ribs after breaking away from the ring, so that product can flow around and underneath the cap, as indicated by arrow a62. Alternatively, for example, the cap itself may be provided with ribs.

Figure 21:
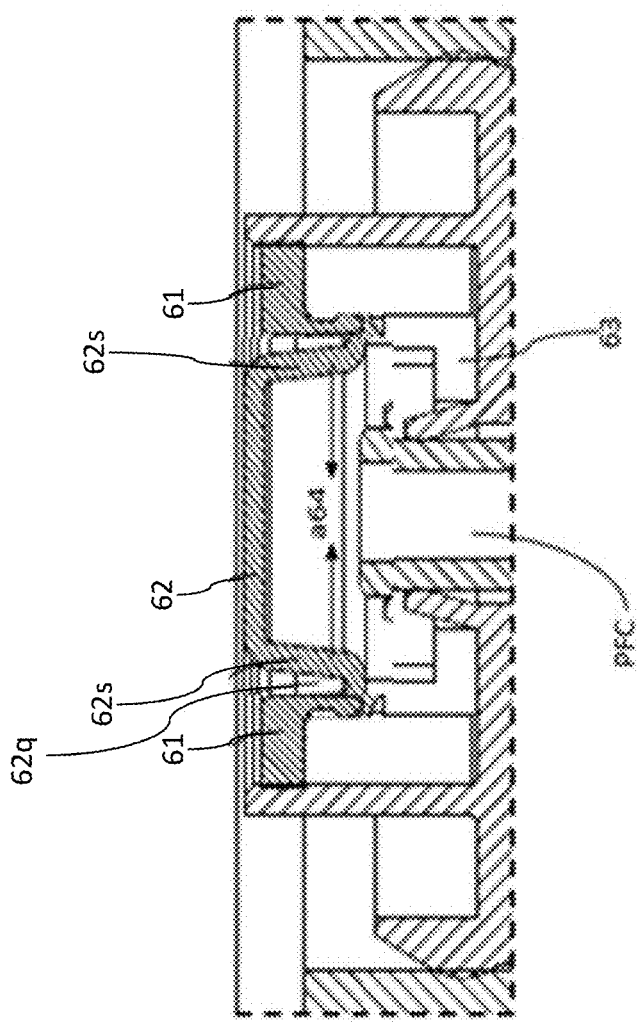
FIG. 21 shows a cross-sectional view of sealing means of a CPU according to an extra advantageous embodiment.

An airtight seal of the CPU at its upstream product entrance can be configured in various ways. FIG. 21 shows an alternative that differs from the example depicted in FIG. 12, in that the seal 61, 62 is further configured so that the sealing cap 62 (in particular a respective outer section 62*s*) can be radially compressed (upon pressurization from the product container) in order to release from the (fixed) ring portion 61, thereby opening a respective product flow path into the CPU. For example, a resilient or bendable neck portion 62*s* of the cap 62 can be pushed radially inwards, away from the opposite (fixed) ring 61, indicated by arrows a64, under the opening pressure exerted by contents of the product container when the container is pressurized (thereby reducing an outer diameter of the sealing cap 62 such that the cap can loosen or untighten from the surrounding retaining ring 61). In particular, as follows from FIG. 21, a circumferential outer side of the neck portion 62*s* of the cap 62 and an opposite inner side of the ring portion 61 can enclose a product pressure receiving slit 62*q*, allowing entry of pressurized product for radially compressing the sealing cap. Thus, pressure induced release of the cap 62 from the ring 61 is further facilitated.

In various embodiments, as is mentioned above, the system includes a pressurization chamber (for pressurizing a product holder). The pressurization chamber can be part of the machine B, or it can be part of a removable product container H. For example, as is mentioned above, the exterior walls TW, SW of the removable container H can act as a bag pressurization chamber. Alternatively, one or more such walls can be integrated in the machine B.

In each of these embodiments, the CPU (and its respective product holder, for example its flexible product bag FB) is preferably exchangeable. The CPU, during use, can extend e.g. partly or substantially outside the respective pressurization chamber (see e.g. FIG. 3A, 3B), through a CPU opening of the chamber (the product processing unit CPU in particular protruding via a wall structure SW of the container, e.g. via a dedicated CPU-receiving port RP, towards a product discharging area, as in FIG. 3B and FIG. 20*b*). In particular, the pressurization chamber can be defined by an external wall structure SW of the container, the wall structure SW including a CPU-receiving port RP for receiving and positioning the product processing unit CPU (see FIGS. 18*b*, 20*a*, 20*b*).

The CPU is preferably configured to cooperate with the pressurization chamber (i.e. with its CPU-receiving port RP) to form an airtight seal there-between when the CPU is received in the CPU opening. Such a seal can be achieved in various ways. For example, a ring element 91 of the CPU may form an airtight seal with the CPU chamber and/or other sealing means (not shown) can be provided between and/or integrated in the CPU and the respective port RP for sealing contact or sealing engagement there-between. Thus, the pressurization chamber can be pressurized to a desired operating pressure, wherein a leakage of pressurization gas from the pressurized space can be prevented.

Preferably, in order to promote ease of use and to prevent faulty operation of the system, the system can be configured to provide feedback to a user regarding formation of the airtight seal between the CPU and the pressurization chamber, upon such formation. For example, the CPU may be configured to cooperate with the CPU receiving port RP to produce a sound and/or a haptic feedback signal, e.g. a click.

To facilitate accurate placement of a CPU through the CPU opening of the port RP (e.g. for lining up a fluid supply opening SV of the CPU to a fluid supply connector 50 of the dispensing machine, as shown in FIGS. 18*a-b*, an external shape 111 of the CPU may be configured to substantially mate with a shape 112 of the CPU receiving opening in the port RP (see also FIG. 20*b*). The respective shapes may thus cause alignment and/or centering of the CPU during placement in or through the CPU opening of the port RP. Preferably, as shown in FIGS. 18*a-b*, the respective shapes are rotationally asymmetric about an axis substantially corresponding to a direction of insertion of the CPU, which direction is indicated by arrow a110 in both figures, wherein the arrow points into the surface of the drawing in FIG. 18*a*. The rotational asymmetry may be provided in various ways, for example, as shown in FIGS. 18*a-b*, by one or more protrusions 113 of the CPU (in this case one) on the side of an otherwise substantially axially symmetric shape. The CPU-receiving port RP can have a mating shape (e.g. aperture, notch) 114 for receiving and engaging the protrusion 113 of the CPU. Such an asymmetry provides for resisting an incorrect insertion, particularly an insertion wherein the CPU is rotated with respect to a desired orientation about the said axis.

Preferably, to facilitate accurate placement including alignment and/or centering, the CPU and/or the CPU receiving port RP can have a tapered shape. For example, as shown in FIG. 18*b*, the shape of the CPU can be tapered from a wider part (top part in FIG. 18*b*) that is proximal to the pressurized space to a narrower part (bottom part in FIG. 18*b*) that is distal to the pressurized space. As a result, the CPU is automatically centered in the CPU receiving port during insertion, thus benefitting ease of operation as well as preventing inaccurate placement.

Figure 20A:
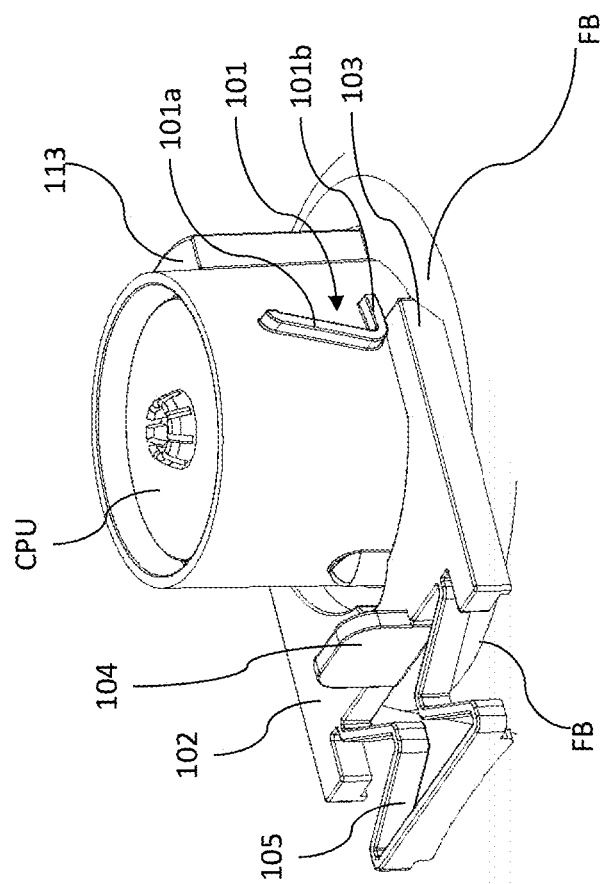

Preferably, to further facilitate CPU-placement, and to ensure that the CPU remains locked in place during operation, as shown in FIGS. 20*a-c*, the system (in particular the container/capsule H) can be provided with a detachable CPU holding latch (clip) 102. FIG. 20*a* shows a perspective view of the CPU connected to a respective flexible bag FB and a CPU holding latch 102, for connecting the CPU to the container wall SW via a CPU-positioning port RP (see FIG. 20*b*). FIG. 20*b* shows a similar view, wherein the lid TW of the product container H has been installed to seal the space containing the flexible bag FW. FIG. 20*c* shows the CPU holding latch as such.

In the example, the CPU includes two L-shaped protrusions 101 on the outside of the CPU (the protrusions 101 facing away from each other). One such protrusion 101 is shown in FIGS. 20*a-c*; another is shown in FIGS. 15*a-b*. These protrusions 101 may be configured to cooperate with the CPU holding latch 102, and the lid TW and CPU-receiving port RP of the external container shell. In particular, after insertion of the CPU through the CPU opening of the CPU-receiving port RP, the arms 103 can be positioned between second sides 101*b* of the L-shaped protrusions 101 and port RP:, for firmly latching the CPU in place. The latch 102 may include a spring element 105, that can e.g. be spring biased by the lid TW of the chamber after assembly, for locking the latch in place (see FIG. 20*b*). Also, the latch 102 can include a handle 104 or the-like for enhancing manual grip.

FIG. 20*b* shows that the external container wall SW may include guide/support elements 107 for assisting placement of the latch 102. Also, FIG. 20*b* shows a CPU-positioning port/positioning structure RP of the external container, the positioning structure RP in particular being configured for substantially surrounding an external side of the CPU in order to correctly position the CPU with respect to the container.

Figure 19:
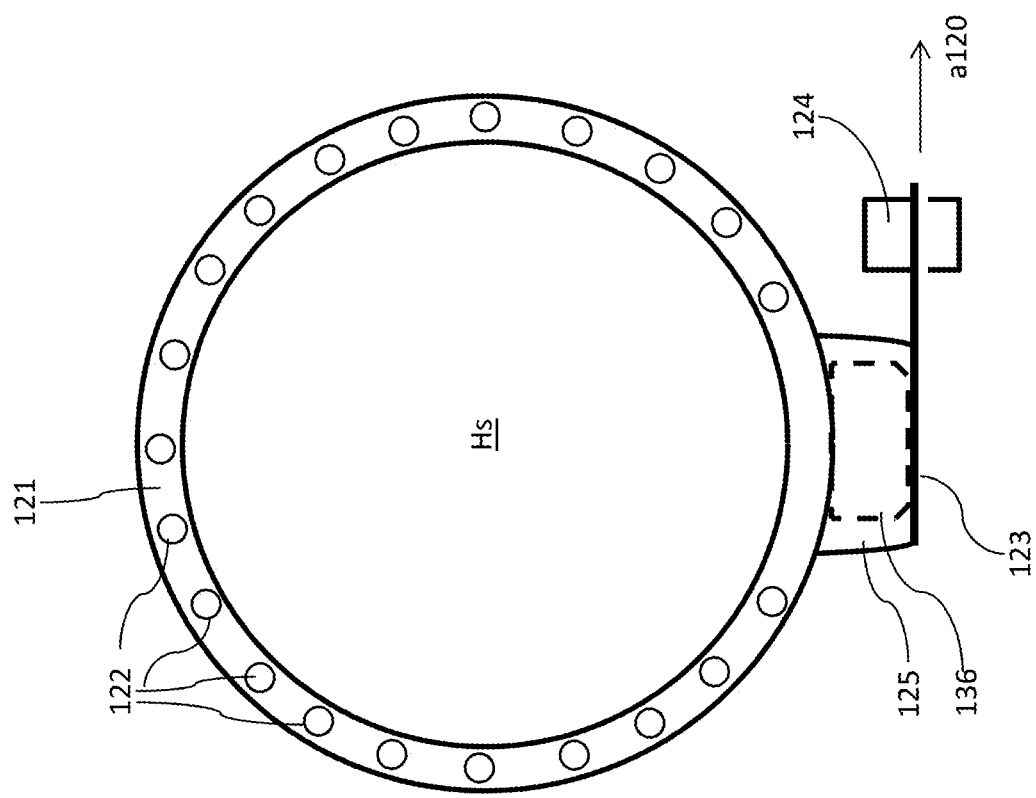
FIG. 19 shows a cross section over line XIX-XIX of FIG. 3B, of a further embodiment of a container receiving space provided with a cooling channel and a movable member.

In an embodiment that is schematically shown in FIG. 19, which may be combined with any of the afore-described examples, a said cooling system CS can be configured to cool the interior of the container receiving space Hs, for cooling a product container including the CPU while it is received in that container receiving space Hs (the container not being shown in FIG. 19). The wall 121 structure of the receiving space Hs can e.g. include or be provided with one or more cooling duct/channel 122 of the cooling system CS, wherein—at least during operation—the cooling channel 122 contains a cooling liquid that is preferably circulated by the cooling system.

Each cooling channel 122 can be configured in various ways and can extend along various paths/directions. For example, one or more cooling channels 122 can extend in parallel with a center line of the container receiving space (as in FIG. 19). Preferably, in order to cool substantially the entire product container receiving space Hs, a said cooling channel 122 can extends along a winding and/or spiral/helical path around the container receiving space Hs.

The wall/wall structure 121 that encloses the container receiving space Hs may have a specific cooled CPU enclosing section (e.g. an extension) 125, which section 125 encompass outer sides of the CPU and respective nozzle NZ (in particular after placement of the container in the container receiving space; the CPU-enclosing section 125 is also schematically drawn by a dashed box in FIG. 3B).

Preferably, the cooled CPU-enclosing section 125 of the wall structure 121 has a product outlet 136 that is closable by a cover member 123. The closable product outlet 123 of the machine wall structure 121 is preferably located close/near to the product outlet of the CPU after container placement.

For example, the system can includes a movable closing member 123 near, e.g. under the CPU (after placement in the machine) for closing/covering the product outlet 136 of the cooled CPU-enclosing section 125. For example, a motor 124 may be provided to move the cover member 123 to an opened position (for example in the direction of arrow a120) to provide a downwards passage for product flow (via the outlet 136) from the CPU during product discharge, and to move the member 123 in an opposite direction after product discharge (to close the outlet 136). This can prevent or significantly reduce heat (and water vapor) exchange from ambient air to the placed CPU (and the product container H) in the receiving space Hs.

Figure 17:
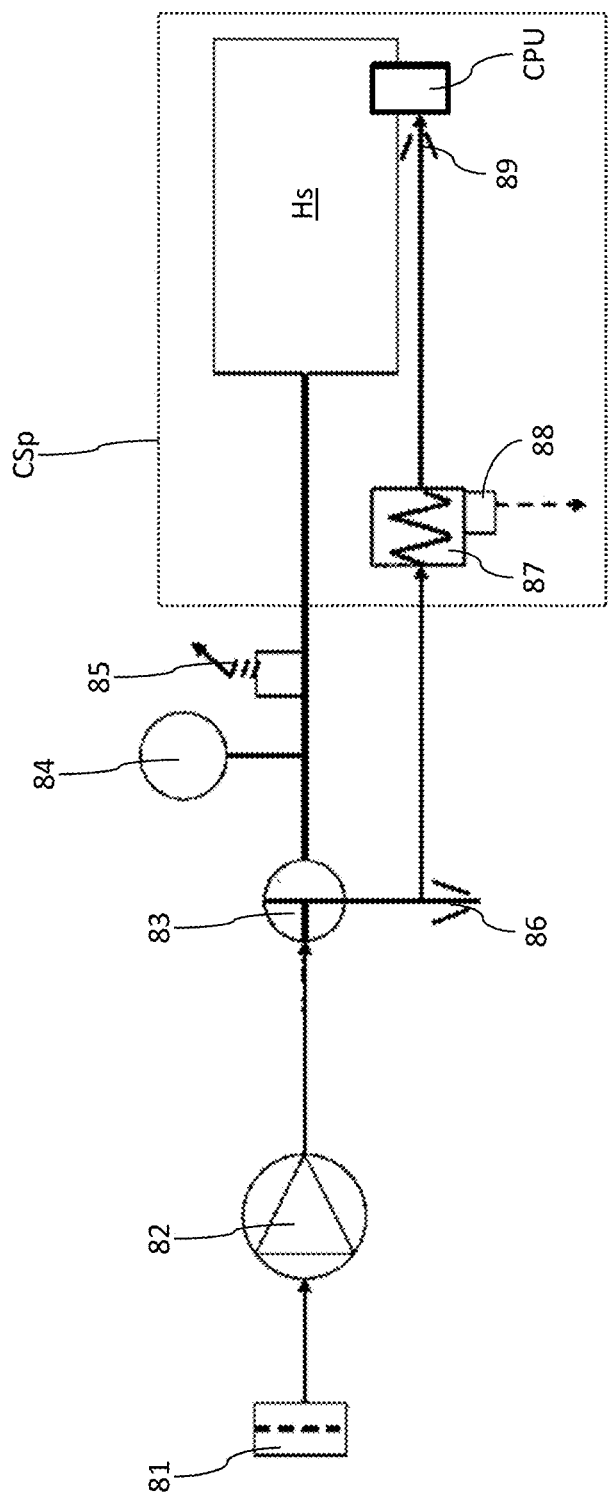
FIG. 17 shows a schematic view of a system for pressurization of a product container and for fluid supply to the CPU.

FIG. 17 shows a schematic view of a combined system for pressurization of a product container and for fluid supply to a CPU. This combined system relates to a preferred embodiment which may be carried out either independent of or in combination with any of the other embodiments. In alternative embodiments, for example, separate systems may be configured for pressurizing the product container and for fluid supply to the CPU.

In the exemplary system shown in FIG. 17, a choked gas supply is implemented, the choked gas supply including a respective flow constriction 89. In particular, as follows from the drawing, ambient air enters a compressor 82 through an air filter 81. A controllable three-way valve 83 directs the pressurized air downstream of the compressor either towards the container receiving space Hs, wherein the system is in a pressurization mode, or towards the CPU, wherein the system is in a dispensing mode. The three-way valve 83 is preferably adjustable by an electronic controller (not shown) between at least the pressurization mode and the dispensing mode. FIG. 17 schematically shows the three-way valve 83 in dispensing mode. In this exemplary embodiment, the pressurization mode and dispensing mode are mutually exclusive, although in alternative embodiments they may occur simultaneously.

In pressurization mode, a pressure sensor 84 measures the pressure in the container and feeds back a representative pressure signal to a controller (not shown) for regulating the pressure through regulation of the compressor 82. A safety valve 85 is provided to depressurize the container in case of excessive pressure, e.g. in case of a failure of the pressure sensor 84, the controller and/or the compressor 82.

In dispensing mode, pressurized air enters a passive condensate block 87 which is positioned in a cooled space CSp of the dispensing system. The condensate block is configured to passively cool and dry the pressurized air and is provided with a drain valve 88 for draining condensate produced by cooling the air, wherein the drain valve 88 is configured to be closed in dispensing mode and open otherwise.

Downstream of the condensate block 87, the pressurized air passes into the CPU through an orifice 89, wherein the orifice provides a flow constriction so that a so-called choked flow condition occurs when air is supplied at sufficiently high pressure upstream of the orifice. In such a choked flow condition, flow velocity of the gas inside the constriction substantially corresponds to a speed of sound in the gas in the constriction. Advantageously, as a result, air flow downstream of the orifice can be substantially flow controlled as opposed to pressure controlled. In particular, a substantially steady air flow through the microfiltration walls 15a of the CPU can be provided substantially irrespective of a level of clogging of those walls 15a, wherein clogging generally results in an increased flow resistance.

Upstream of the condensate block and downstream of the three-way valve, a bypass orifice 86 can be provided to evacuate excess air if the compressor is oversized.

It is self-evident that the invention is not limited to the above-described exemplary embodiments. Various modifications are possible within the framework of the invention as set forth in the appended claims.

Thus, the product can comprise, for instance, an edible or non edible protein, a protein mixture or protein solution. An edible protein solution can comprise, for instance, a milk protein, a whey protein and casein, egg white proteins, yeast isolate, soy protein, hemoglobin, vegetal protein isolate, meat protein, collagen, gelatin and the like.

The product may be, for instance, homogeneously or non homogeneously foamed.

The product can be a food product, or a cosmetic product, a cleaner and/or a different type of product.

The product can further contain various substances, for instance, a thickener, coloring, flavoring and the like.

For example, alternative modes of valve operation may be employed, and fluid paths may be laid out along various spatial trajectories without substantially affecting the functional performance of the system.

Further, the product dispensing machine can be configured to pressurize the product container in various ways. In an example, the machine can include one or more pumps or pumping means for pressurizing the container. In addition or besides, the machine can be configured to include one or more dedicated high pressure reservoirs (e.g. one or more gas cylinders, being filled with gas at high pressure, e.g. a pressure higher tan 100 bar), or to be connected to an external high pressure gas supply, for pressuring a product container.

Moreover, as is mentioned before, the product container as such can be configured in various ways. It may include e.g. a pressurization chamber but that is not required (for example, the dispensing machine B itself may include a pressurization chamber for receiving a product container). Also, is follows from the embodiments described, the product container may be partly or entirely removable from the dispensing machine, in particular to be exchanged with a new (part).

Moreover, in various embodiments, the frothing device 15 includes at least one microfiltration device, for supplying gas to the product (for foaming). In this way good foaming results can be achieved. However, the system (in particular the CPU) can additionally or alternatively include one or more other frothing elements to provide product foaming, for example one or more filter elements, one or more gas injector devices for injecting gas into the product, one or more stirring devices, one or more turbulence inducers for inducting turbulence in a product flow, a combination of one or such elements and/or in a different manner.

Further, as follows from the above, a replaceable product container H as such can be configured in various ways. It can be provided by a single container wall that encloses an interior space for holding the product. Also, it can be provided by an external (e.g. rigid) wall that encloses an interior space, for receiving an internal product holder (e.g. a flexible bag or a product holder having at least one flexible wall). The product container as such can be configured to be pressurized. Further, the product container can act as a removable capsule during operation, for positioning product (e.g. a product holder) in the dispensing machine B.

Moreover, in above-embodiments, the machine B itself includes a cooling system CS, in particular for cooling a container receiving space Hs. In a further or alternative embodiment, the product container itself (e.g. an aforementioned capsule SW) is provided with cooling means for cooling the container. As an example, an outer wall SW of the container can include one or more cooling ducts for circulating a cooling medium through that wall, wherein such cooling ducts can e.g. be fed by the cooling system of the machine B with the cooling medium during operation (via respective, interacting cooling medium ports). In another embodiment, the cooling system can be integrated with the replaceable container itself. In yet another embodiment, the container wall SW can include one or more Peltier elements for removing heat from the container, wherein a power supply for such elements can be integrated with the container and/or with the dispensing machine B (in the latter case, dedicated electric contacts between the machine B and the container SW can be implemented for transferring Peltier element cooling power from the machine B to the container).

Further, the CPU is preferably configured such that, before initial use, the interior of the CPU (in particular its interior product ducts and processing space/spaces as well as its interior gas ducts) are hermetically sealed off from an environment of the respective product container H, in an airtight manner. This can be achieved by the CPU construction (i.e. its outer wall sections, see e.g. FIG. 12) and by application of gas tight sealing means that seal the product input/output openings as well as the gas injection opening (see e.g. FIG. 12 again) before initial use. For example, a main outer wall structure of the CPU can be assembled from a number of different CPU sections, in particular a top section including the product inlet part and at least a further section including a gas injection part (the section e.g. being plastic CPU sections, made e.g. via plastic injection moulding and/or other manufacturing steps), wherein such CPU sections can be joined to each other in a manner to provide an hermetically sealed outer CPU surface (except for product input/discharge openings and the gas injection opening that can be sealed via dedicated sealing means, e.g. afterwards, as is described above).

Further, according to an aspect, the product container H does not necessarily need to be a loose (exchangeable) container. According to an embodiment, it can also be integrated in the machine/appliance.

Further, the product container H can be a disposable container.

Further, according to an embodiment, the container can be a bottle or bottle-type container.

For example, the exchangeable product container can be a bag in container (BIC), or a bag in box (BIB) or bottle in bottle container (BIB), as will be appreciated by the skilled person.

We claim:

1. A foamed product dispensing system, wherein the system includes:
    a product dispensing machine configured to receive an exchangeable product container, wherein the exchangeable product container is configured to cooperate with the product dispensing machine after placement in the machine;
    wherein the exchangeable product container contains a foamable product, wherein the exchangeable product container is provided with a product processing unit including a frothing device having a product entrance for receiving product and a product exit for discharging product, wherein the processing unit is connectable to a fluid supply for supplying gas to the product,
    wherein the product processing unit includes a product feedthrough channel upstream of the frothing device, closable by a valve member,
    wherein the product processing unit includes a fluid feedthrough channel upstream of the frothing device,
    wherein said valve member is configured for providing a fluid communication between said fluid feedthrough channel of the product processing unit and a fluid supply of the dispensing machine, and
    wherein the dispensing machine includes a valve actuator configured to cooperate with the valve member of a placed product container for moving the valve member between a product feedthrough state and a product flow blocking state.

2. The system according to claim 1, wherein the valve member is at least rotatable between a product feedthrough state and a product flow blocking state.

3. The system according to claim 1, wherein the valve member includes a fluid passage arranged to connect to a fluid injector of the dispensing machine when the exchangeable product container is in an operating position in the machine.

4. The system according to claim 1, wherein the dispensing machine includes a cooling system, which is designed to cool said exchangeable product container, including said product processing unit.

5. The system according to claim 1, wherein the product dispensing machine includes a container receiving space for receiving the exchangeable product container, the exchangeable product container being exchangeable from the respective container receiving space.

6. The system according to claim 1, wherein the exchangeable product container includes a flexible bag filled with foamable product to be discharged.

7. The system according to claim 6, wherein the exchangeable product container and/or the container receiving space includes a fluid inlet for receiving fluid from the product dispensing machine, in particular from a respective fluid outlet that connects to the fluid inlet after placement of the exchangeable product container in the machine, in order to pressurize the exchangeable product container.

8. The system according to claim 1, wherein the frothing device is provided with a microfiltration wall having gas transmissive pores, which separates a gas supply space associated with the fluid supply from a foaming channel associated with the product entrance.

9. The system according to claim 1, wherein the frothing device is provided with a housing comprising a product entrance for supply of product, a gas inlet for supply of gas, and an exit for discharge of product provided with gas, wherein said gas inlet terminates in a gas receiving space, which is separated by means of a microfiltration wall from said product entrance and exit.

10. The system according to claim 1, wherein the product dispensing machine is provided with a control unit configured for controlling fluid flow and product flow to the processing unit.

11. The system according to claim 1, wherein the product processing unit includes an airtight seal configured to block a flow of gas from the product processing unit into the exchangeable product container before initial use of the exchangeable product container, and to provide a passage for flow of product from the exchangeable product container into the product processing unit during use of the exchangeable product container.

12. The foamed product dispensing system according to claim 1, wherein the system includes:
    a product dispensing machine, configured to receive an exchangeable product container, wherein the exchangeable product container is configured to cooperate with the product dispensing machine, after placement in the machine;
    wherein the exchangeable product container contains a foamable product, wherein the exchangeable product container is provided with a product processing unit including a frothing device having a product entrance for receiving product and a product exit for discharging product, wherein the processing unit is connectable to a fluid supply for supplying gas to the product,
    wherein the frothing device is provided with a microfiltration wall having gas transmissive pores which separates a gas supply space associated with the fluid supply from a foaming channel associated with the product entrance, and
    wherein the microfiltration wall includes a hydrophobic and/or oleophobic material.

13. The foamed product dispensing system according to claim 1, wherein the system includes:
    a product dispensing machine, configured to receive an exchangeable product container, wherein the exchangeable product container is configured to cooperate with the product dispensing machine, after placement in the machine;
    wherein the exchangeable product container contains a foamable product, wherein the exchangeable product container is provided with a product processing unit including a frothing device having a product entrance for receiving product and a product exit for discharging product, wherein the processing unit is connectable to a fluid supply for supplying gas to the product,
- wherein the product dispensing machine includes a container receiving space for receiving the exchangeable product container, the exchangeable product container being exchangeable from the respective container receiving, and
- wherein the dispensing machine includes a cooling system, which is configured to cool said exchangeable product container after placement in the container receiving space.

14. The system according to claim 13, including a closing member for closing the closable product passage of the wall structure of the container receiving space, the closing member in particular being configured to limit heat transfer between an environment of the system on one hand and the container receiving space on the other,
- wherein the closing member is movable towards an opened state, permitting foamed product discharge via the product passage of the wall structure of the container receiving space.

15. The foamed product dispensing system according to claim 1, wherein the system includes:
- a product dispensing machine, configured to receive an exchangeable product container, wherein the exchangeable product container is configured to cooperate with the product dispensing machine, after placement in the machine;
- wherein the exchangeable product container has a product holding space containing a foamable product, wherein the exchangeable product container is provided with a product processing unit including a frothing device having a product entrance for receiving product and a product exit for discharging product, wherein the processing unit is connectable to a fluid supply for supplying gas to the product, and
- wherein the product processing unit includes an airtight seal configured to hermetically seal a product flow path between the product processing unit and the product holdings space of the exchangeable product container before initial use of the exchangeable product container, and to provide a passage for flow of product from the exchangeable product container towards the frothing device during use of the exchangeable product container.

16. The foamed product dispensing system according to claim 1, wherein the system includes:
- a product dispensing machine, configured to receive an exchangeable product container, wherein the exchangeable product container is configured to cooperate with the product dispensing machine, after placement in a pressurization chamber in the machine;
- wherein the exchangeable product container contains a foamable product, wherein the exchangeable product container is provided with a product processing unit including a frothing device having a product entrance for receiving product and a product exit for discharging product, wherein the processing unit is connectable to a fluid supply for supplying gas to the product, and
- wherein the pressurization chamber is defined by a wall structure, the wall structure including a receiving port for receiving the product processing unit, and for engaging an exterior surface of the product processing unit in an airtight manner, the product processing unit in particular protruding through the port towards a product discharging area.

17. The foamed product dispensing system according to claim 1, wherein the system includes:
- a product dispensing machine configured to receive an exchangeable product container, wherein the exchangeable product container is configured to cooperate with the product dispensing machine, after placement in the machine;
- wherein the exchangeable product container contains a foamable product, wherein the exchangeable product container is provided with a product processing unit including a frothing device having a product entrance for receiving product and a product exit for discharging product, wherein the processing unit is connectable to a fluid supply for supplying gas to the product, and
- wherein the product processing unit is provided with an airtight sealing cap configured to seal a downstream product discharge area of the product processing unit from an environment, the downstream area containing a product discharge nozzle of the system.

18. The foamed product dispensing system according to claim 1, wherein the system includes:
- a product dispensing machine, configured to receive an exchangeable product container, wherein the exchangeable product container is configured to cooperate with the product dispensing machine, after placement in the machine;
- wherein the exchangeable product container contains a foamable product, wherein the exchangeable product container is provided with a product processing unit including a frothing device having a product entrance for receiving product and a product exit for discharging product, wherein the processing unit is connectable to a fluid supply for supplying gas to the product,
- wherein, during use, the product processing unit extends outside a pressurized space of the system, wherein a border of the pressurized space includes a opening for exchangeably receiving the product processing unit,
- wherein the system includes a wall structure, the wall structure including a receiving port for receiving the product processing unit, and
- wherein a shape of the product processing unit is configured to substantially mate with a shape of the receiving port for positioning the product processing unit with respect to the wall structure.

19. The foamed product dispensing system according to claim 1, wherein the system includes:
- a product dispensing machine, configured to receive an exchangeable product container, wherein the exchangeable product container is configured to cooperate with the product dispensing machine and pressurized, after placement in the machine;
- wherein the exchangeable product container contains a foamable product, wherein the exchangeable product container is provided with a product processing unit including a frothing device having a product entrance for receiving product and a product exit for discharging product, wherein the processing unit is connectable to a fluid supply for supplying gas to the product, and
- wherein the system further includes an exchangeable capsule configured to exchangeably receive the exchangeable product container, wherein the machine is configured to exchangeably receive the capsule containing the exchangeable product container.

20. A foamed product dispensing system, wherein the system includes:
- a product dispensing machine, configured to receive an exchangeable product container, wherein the exchangeable product container is configured to cooperate with the product dispensing machine, after placement in the machine;

wherein the exchangeable product container contains a foamable product, wherein the exchangeable product container is provided with a product processing unit including a frothing device having a product entrance in fluid communication with a foaming channel for receiving product, a gas supply for supplying gas to a gas supply space, a microfiltration wall separating the gas supply space from the foaming channel and having gas transmissive pores for injecting gas into the foaming channel, and a gas injected product exit for discharging the gas injected product, and wherein the gas supply is a choked flow gas supply.

21. A foamed product dispensing system, wherein the system includes:

a product dispensing machine configured to receive an exchangeable product container, wherein the exchangeable product container is configured to cooperate with the product dispensing machine, after placement in the machine, wherein the product container contains a foamable product, wherein the product container is provided with a product processing unit including a frothing device having a product entrance for receiving product and a product exit for discharging product, wherein the processing unit is connectable to a fluid supply for supplying gas to the product, wherein the product processing unit includes a product feedthrough channel upstream of the frothing device, closable by a valve member, wherein the product processing unit includes a fluid feedthrough channel upstream of the frothing device, wherein said valve member is configured for providing a fluid communication between said fluid feedthrough channel of the product processing unit and a fluid supply of the dispensing machine, and wherein the frothing device is provided with a microfiltration wall having gas transmissive pores, which separates a gas supply space associated with the fluid supply from a foaming channel associated with the product entrance.

22. A foamed product dispensing system, wherein the system includes:

a product dispensing machine configured to receive an exchangeable product container, wherein the exchangeable product container is configured to cooperate with the product dispensing machine, after placement in the machine, wherein the product container contains a foamable product, wherein the product container is provided with a product processing unit including a frothing device having a product entrance for receiving product and a product exit for discharging product, wherein the processing unit is connectable to a fluid supply for supplying gas to the product, wherein the product processing unit includes a product feedthrough channel upstream of the frothing device, closable by a valve member, wherein the product processing unit includes a fluid feedthrough channel upstream of the frothing device, wherein said valve member is configured for providing a fluid communication between said fluid feedthrough channel of the product processing unit and a fluid supply of the dispensing machine, and wherein the frothing device is provided with a housing comprising a product entrance for supply of product, a gas inlet for supply of gas, and an exit for discharge of product provided with gas, wherein said gas inlet terminates in a gas receiving space which is separated by means of a microfiltration wall from said product entrance and exit.

23. A foamed product dispensing system, wherein the system includes:

a product dispensing machine configured to receive an exchangeable product container, wherein the product container is configured to cooperate with the product dispensing machine, after placement in the machine, wherein the product container contains a foamable product, wherein the product container is provided with a product processing unit including a frothing device having a product entrance for receiving product and a product exit for discharging product, wherein the processing unit is connectable to a fluid supply for supplying gas to the product, wherein the product processing unit includes a product feedthrough channel upstream of the frothing device, closable by a valve member, wherein the product processing unit includes a fluid feedthrough channel upstream of the frothing device, wherein said valve member is configured for providing a fluid communication between said fluid feedthrough channel of the product processing unit and a fluid supply of the dispensing machine, wherein the frothing device is provided with a microfiltration wall having gas transmissive pores, which separates a gas supply space associated with the fluid supply from a foaming channel associated with the product entrance, and wherein the microfiltration wall includes a hydrophobic and/or oleophobic material.

* * * * *